US007840575B2

(12) United States Patent  
Chandrasekaran

(10) Patent No.: US 7,840,575 B2  
(45) Date of Patent: Nov. 23, 2010

(54) EVALUATING EVENT-GENERATED DATA USING APPEND-ONLY TABLES

(75) Inventor: Sashikanth Chandrasekaran, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 770 days.

(21) Appl. No.: 11/638,743

(22) Filed: Dec. 13, 2006

(65) Prior Publication Data

US 2007/0271573 A1 Nov. 22, 2007

Related U.S. Application Data

(60) Provisional application No. 60/801,707, filed on May 19, 2006.

(51) Int. Cl.
   *G06F 7/00* (2006.01)
   *G06F 17/30* (2006.01)
   *G06F 12/00* (2006.01)

(52) U.S. Cl. .................. 707/754; 707/821; 719/318

(58) Field of Classification Search ............... 707/200, 707/999.2, 754, 821; 719/318
See application file for complete search history.

(56) References Cited

U.S. PATENT DOCUMENTS

| | | | | |
|---|---|---|---|---|
| 6,367,034 | B1 * | 4/2002 | Novik et al. | 714/39 |
| 6,810,419 | B1 * | 10/2004 | Bogler et al. | 709/224 |
| 7,406,488 | B2 * | 7/2008 | Stager et al. | 707/204 |
| 7,523,462 | B1 | 4/2009 | Nesamoney et al. | |
| 2002/0194393 | A1 * | 12/2002 | Hrischuk et al. | 709/318 |
| 2006/0085456 | A1 | 4/2006 | Pickering | |
| 2006/0155719 | A1 * | 7/2006 | Mihaeli et al. | 707/100 |
| 2006/0265406 | A1 * | 11/2006 | Chkodrov et al. | 707/100 |

OTHER PUBLICATIONS

U.S. Appl. No. 11/638,737, Final Office Action dated May 21, 2010.*
ADI, ASAF, et al., "The Situation Manager Rule Language", IBM Research Laboratories, printed on Apr. 2, 2007, 16 pages.
Gehani, N. H., et al., "Composite Event Specification in Active Databases: Model & Implementation", AT&T Bell Laboratories, Proceedings of the 18th International Conferences on Very Large Databases, 1992, 26 pages.
Selinger, P. Griffiths, et al., "Access Path Selection in a Relational Database Management System", IBM Research Division, proceedings of ACM-SIGMOD conference, 1979, 12 pages.

(Continued)

*Primary Examiner*—James Trujillo
*Assistant Examiner*—Bruce M Moser
(74) *Attorney, Agent, or Firm*—Hickman Palermo Truong & Becker LLP

(57) ABSTRACT

Techniques are provided for evaluating base events, compound events, and logical update events in an event processing system. In one embodiment, the base events, compound events, and logical update events are definitions in a particular syntax language that specify conditions for evaluating input event data. In this embodiment, base event definitions are evaluated over the input event data; logical update event definitions are evaluated by determining whether the effect of any earlier event is changed by the arrival of a new event; and compound event definitions are evaluated over records representing events that have been selected by evaluating the base event definitions over the input event data.

32 Claims, 9 Drawing Sheets

OTHER PUBLICATIONS

Seshadri, Praveen, et al., "Sequence Query Processing", University of Wisconsin-Madison, Computer Science Department, SIGMOD 1994, written May 1994, 12 pages.
Seshadri, Praveen, et al., "SEQ: A Model for Sequence Databases", University of Wisconsin, Computer Sciences Department, ICDE 1995, 8 pages.
Snodgrass, Richard T., "Developing Time-Oriented Database Applications in SQL", Morgan Kaufmann Publishers, 2000, ISBN 1-55860-436-7, pp. 1-4, 11-15, 166-241, 276-299.
Sybase, "Sybase IQ Business Intelligence Software—Data Warehousing—Mining—Business Analytics", Sybase Inc.htm, found on website <http://www.sybase.com/products/datawarehousing/sybaseiq>, printed on Mar. 22, 2007, 2 pages.
Yan, Tak W., et al., "Index Structures for Selective Dissemination of Information Under the Boolean Model", Stanford University, ACM Transactions on Database Systems, vol. 19. No. 2, Jun. 1994, 33 pages.
Doorenbos, Robert B., "Production Matching for Large Learning Systems", Carnegie Mellon University, Year of Publication: 1995, Order No. GAX95-22942, 208 pages.
Segev, Arie, et al., "Event-Join Optimization in Temporal Relational Databases", In Proceedings of the Conference on Very Large Databases, 1989, 12 pages.
Sirius Software, Inc., "Model 204—A Novel DBMS and Application Platform", retrieved from internet : http://sirius-software.com/m204.html, printed Dec. 9, 2009, 2 pages.

* cited by examiner

EVALUATING EVENT-GENERATED DATA USING APPEND-ONLY TABLES

PRIORITY CLAIM; CROSS-REFERENCE TO RELATED APPLICATIONS

This application claims priority under 35 U.S.C. §119(e) to U.S. Provisional Patent Application No. 60/801,707, entitled "SEQUENCE EVENT PROCESSING USING APPEND-ONLY TABLES", filed by Sashikanth Chandrasekaran on May 19, 2006, the entire contents of which are hereby incorporated by reference for all purposes as if fully set forth herein.

This application is related to U.S. patent application Ser. No. 11/638,737, entitled "SEQUENCE EVENT PROCESSING USING APPEND-ONLY TABLES", filed by Sashikanth Chandrasekaran on the same day herewith Dec. 13, 2006, the entire contents of which is hereby incorporated by reference for all purposes as if fully set forth herein.

FIELD OF THE INVENTION

The present invention generally relates to event processing. The invention relates more specifically to processing sequences of events by using append-only sequences.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In many application systems, data may be generated and transitioned through a sequence of events which represent various activities that take place in these systems. Such events typically have a natural ordering based on wall-clock time. Although a sequence of events may be a convenient logical abstraction for the activities that it represents, many application systems may not physically store and query event-generated data as sequences because most of the transactions and queries in these application systems are based on currently processed data. Thus, it may be burdensome to develop such application systems to manage a trail of events that tracks activity based on wall-clock time. However, in some types of application systems it may be useful to model, physically store, and query the event-generated data as sequences in order to provide the ability to evaluate the impact of events that are generated at different points in time.

According to one approach for processing sequences of events that are generated at different points in time, users interested in such time-correlated events need to write complex Structured Query Language (SQL) queries against time-stamped event-generated data that may be stored in different tables of different databases and/or data warehouses. One disadvantage of this approach is that complex SQL queries are expensive to execute because they tend to use a lot of computing resources (e.g., memory and CPU cycles) especially when such queries need to be run against data generated by a large number of events. Another disadvantage of this approach is that such SQL queries tend to be very complex and thus beyond the ability of most users that typically need the results of these queries.

According to another approach for processing sequences of events that are generated at different points in time, application developers include custom code in the application systems, where the custom code provides for storing the data generated by the events of interest and for querying the event-generated data. One disadvantage of this approach is that developing such custom code is burdensome because it may require a lot of development time and intricate testing even though the custom code may not be required by the core functionality of the application systems in which it is included. Another disadvantage of this approach is that it does not provide flexibility with respect to the events that need to be monitored and the queries that need to be run based on the monitored events. For example, in order to add the monitoring of a new event or to add a new query against event-generated data, this approach may require the custom code (and/or the entire application) to be modified, re-compiled, tested, and re-installed.

Based on the foregoing, techniques are clearly needed for efficiently processing sequences of events that may occur at different points in time.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
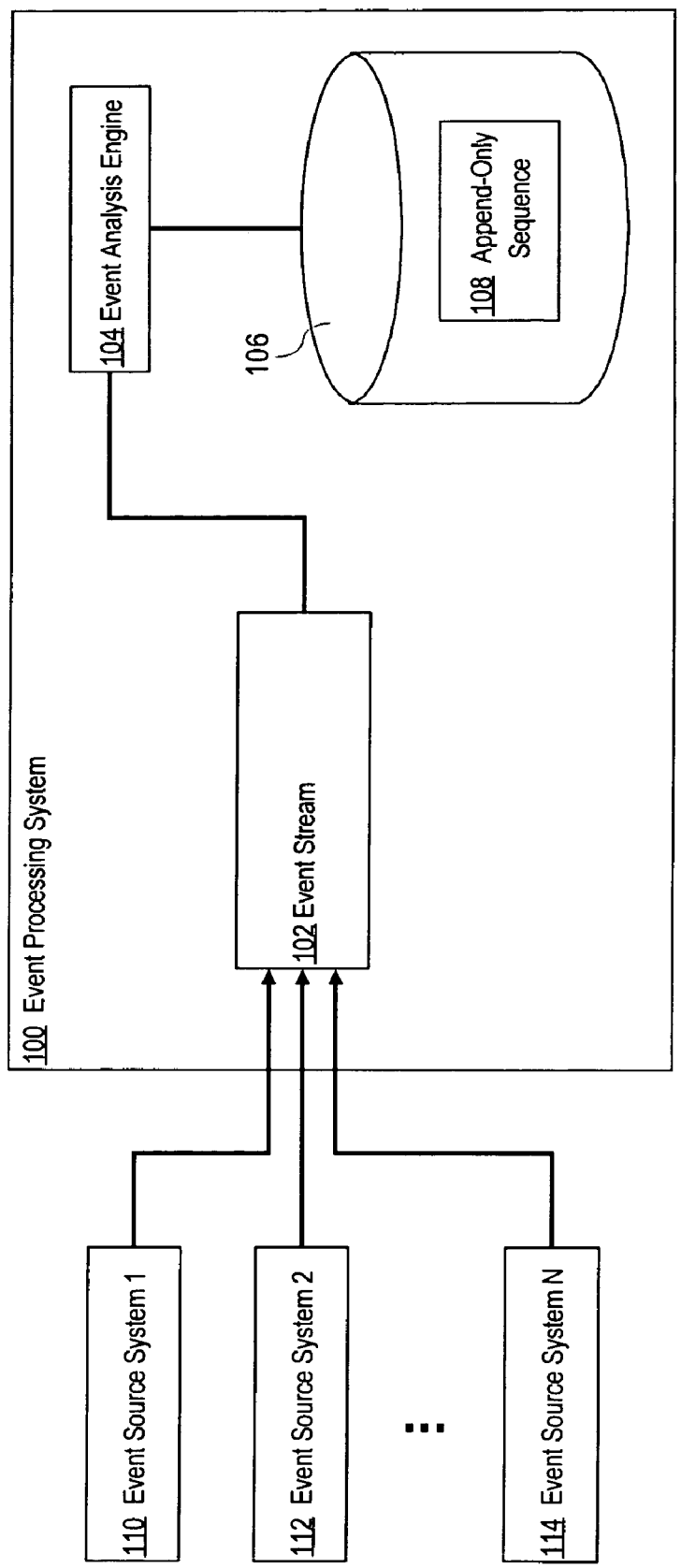
FIG. 1 is a block diagram that illustrates an example event processing system.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1.0 Structural and Functional Overview

Techniques are described herein for processing sequences of events. As used herein, "event" refers to the completion of a particular activity or set of activities that are performed in one or more computer systems. (Some examples of event activities include, but are not limited to, committing a transaction, creating a user account, deleting a user account, a user logging into a computer system, a user logging out of a computer system, changing the password associated with a user account, changing permissions associated with a user account, and a user accessing some resources in a computer system.) The completion of a particular activity or a set of activities, which determine a particular event, is typically associated with generating a data record that characterizes the particular event. An activity or a set of activities may be performed in a computer system by executing one or more operations, where the one or more operations may be initiated by a user, by the computer system or components thereof, and/or by another one or more computer systems.

The techniques described herein provide for processing, selecting, and storing multiple events as an append-only sequence, and for evaluating expressions and queries based on event definitions and on multiple events that are stored in an append-only sequence. As used herein, "append-only sequence" refers to a storage representation of multiple events that allows for appending new events but does not allow for modifying and deleting the representation of already existing events. For example, in some embodiments a plurality of records representing a plurality of events may be stored in an append-only sequence as rows in one or more tables that allow insert operations but does not allow update and delete operations on the rows stored therein. Logically modeling and physically storing multiple events in an append-only sequence provides for, among other things, querying of events as of any time in the past and for recreating the historical trail of the stored events.

In one embodiment, the techniques described herein encompass a method for receiving and processing a stream of events. A plurality of records is selected from the stream of events, where the plurality of records is generated by one or more computer systems and represents a plurality of events that have occurred in these computer systems. The plurality of events is processed, where processing the plurality of events comprises storing the plurality of records in an append-only sequence. One or more expressions are then evaluated based on the plurality of records that are stored in the append-only sequence. The one or more expressions may comprise a query or a statement that conforms to a particular syntax specification.

In one embodiment, the techniques described herein encompass a method for processing and evaluating base events. As used herein, a "base event" refers to a definition that specifies conditions for selecting a plurality of events from a stream of received events based on event attributes that are stored in records that represent the events in the stream. A filter is created, where the filter specifies an array of constant values corresponding to one or more attributes that are defined for one or more events. A stream of records is received and stored in memory. The stream of records represents a stream of events, where each record of the stream of records includes a set of attributes that are associated with a particular event, of the stream of events, that is represented by that record. A plurality of events is selected from the stream of events by applying the filter to the stream of records in order to select a corresponding plurality of records. Applying the filter comprises performing one or more array operations to compare the array of constant values specified in the filter to attributes stored in the plurality of records. As used herein, an "array operation" refers to an operation performed on data that is organized as a multi-dimensional array, where the operation simultaneously involves two or more dimensions of the data. After the plurality of records is selected from the stream of records, the plurality of records is stored in an append-only sequence.

In one embodiment, the techniques described herein encompass a method for processing and evaluating compound events. As used herein, a "compound event" refers to a definition that specifies conditions that correlate multiple base events. A request to evaluate a compound event is received. The compound event specifies correlation conditions between a set of base events. A sequence of events is retrieved from an append-only sequence. Each event in the retrieved sequence has been selected into the append-only sequence based on conditions specified in the set of base events correlated by the compound event. The compound event is evaluated, where evaluating the compound event comprises: analyzing the correlation conditions that are specified in the compound event, automatically splitting the sequence of events into two or more sub-sequences based on the analysis of the correlation conditions, and processing the two or more sub-sequences of events in parallel.

FIG. 1 is a block diagram that illustrates an example event processing system. One or more event source systems, such as systems 110, 112, and 114, are communicatively and/or operatively coupled to event processing system 100. An event source system generates records to represent events that reflect activities occurring in the system. As used herein, an event source system refers to a combination of software components and an allocation of computational resources, such as memory, CPU time, and/or disk storage space. Examples of event source systems include, but are not limited to, Operating Systems (OS), Database Management Systems (DBMS), and various application systems such as, for example, resource and/or user repositories and LDAP directories. In some embodiments of the techniques described herein, multiple event source systems may be executing on separate hardware platforms. In some embodiments, multiple event source systems may be executing on the same hardware platform. In some embodiments, different components of the same computer system may be event source systems from the perspective of the techniques described herein. The techniques described herein are not limited to being implemented with respect to events generated in any particular event source system, and for this reason the examples of event source systems described herein are to be regarded in an illustrative rather than a restrictive sense.

Event processing system 100 comprises event stream 102, event analysis engine 104, and database 106, which includes one or more append-only sequences such as append-only sequence 108. Event processing system 100 refers to a combination of software components and an allocation of computational resources, such as memory, CPU time, and/or disk storage space. In some embodiments, an event processing system may be implemented as a module of database server that manages data stored in one or more databases. In some embodiments, an event processing system may be implemented as a standalone application or an application server that is communicatively coupled to one or more databases. In some embodiments, an event processing system may be implemented as a service or daemon that is communicatively coupled to one or more databases. Thus, the example event processing system 100 depicted in FIG. 1 is to be regarded in an illustrative rather than a restrictive sense.

Event stream 102 is a storage structure for storing records that represent events generated by event source systems, such as systems 110, 112, and 114. According to the techniques described herein, event stream 102 may store records representing events generated by multiple event source systems. In some embodiments, event stream 102 may be implemented in volatile memory, for example RAM. In other embodiments, event stream 102 may be implemented in persistent storage, for example electromagnetic or optical disk. In yet other embodiments, event stream 102 may be implemented in a combination of volatile memory and persistent storage. Thus, the techniques described herein are not limited to any particular type of event stream storage structures.

In the example event processing system of FIG. 1, event analysis engine 104 is implemented as a combination of software components and an allocation of computational resources, such as memory, CPU time, and/or disk storage space. The software components, when executed by one or more processors, are operable to implement the techniques described herein for storing, processing, and evaluating of events. Event analysis engine 104 may also include components that provide one or more user interfaces through which users may define base and compound events, as well as components that provide for receiving, compiling, and/or executing queries and other expressions that are submitted by users, computer processes, or any other computer system entities or components. In some embodiments, the event analysis engine may be implemented as one or more Application-Specific Integrated Circuits (ASIC) that are operable to perform the techniques described herein. Thus, the techniques described herein are not limited to any particular implementation of an event analysis engine.

In one embodiment, database 106 may be a relational database. In this embodiment, database 106 may store append-only sequence 108 as one or more relational tables. In another embodiment, database 106 may be represented a set of files in a file system. Other embodiments, database 106 may be an object-relational database, a hierarchical database, or any other type of storage in which data may be stored. In some embodiments, in addition to one or more append-only sequences, a database may include other storage structures for storing additional information associated with the one or more append-only sequences, such as, for example, base and compound event definitions and various indexes.

2.0 Common Characteristics of Events and Event Sequences

The techniques described herein may be implemented for sequences of different types of events including, but not limited, security events, order-related events, and various other types of events. The techniques described herein may be implemented for any types of events that may have some of the following characteristics:

- a long life-span;
- the difference between the time of occurrence of two events of interest may be arbitrarily large;
- queries over event-generated data may need to account for complex correlations that involve event attributes and aggregates over windows;
- analysis of the events may be needed at the detail level, not at the aggregate level;
- the events may be generated as a result of transactional operations, and the transactional data generated thereof may be managed by a separate DBMS using conventional methods;
- common queries may be used to monitor sequence of events; and
- exact trail of occurred events may be necessary, for example in regulated environments such as finance and banking.

3.0 Example Operational Contexts

3.1 Security Event Processing System Using Simple Event Correlation

In one embodiment, a security alarm system that monitors accesses to databases and applications is provided. Users of the security alarm system, usually security administrators or analysts, are provided with interface for defining and storing policies in a particular event specification language. The security alarm system allows complex correlations, aggregations, and pattern matches between security events that may be generated in one or more event source systems. A stream of security events may be received from the event source systems in various forms, such as, for example, as audit records and/or trace file entries. The security alarm system or one or more components thereof constantly monitor the stream of the received security events and flag events that violate the defined policies. In addition, the security alert system in this embodiment provides for evaluating complex policies that are retroactively verified based on past security events.

In this embodiment, a list of legitimate users is maintained in a central directory. According to one example policy, the security alarm system needs to verify that if a user is able to login to a particular system, then the user must have an active status in the central directory. Suppose that every user's login to any database system creates an event e1. Suppose also that the event that sets the user's status as active in the central directory is event e2. For example, a CREATE USER statement issued in the central directory could generate event e2. According to the techniques described herein, the security alarm system can verify this policy of "e1 implies e2" by executing the following query 3.1 over the stream of received events:

Q3.1 e1 ( ) and not exists e2(timestamp<e1.timestamp, target=e1.username)

where timestamp is the wall-clock time at which an event is generated, username is an identifier of the user that performed the login action, and target is an entity for which the action is performed. All events, e1, that satisfy the above query 3.1 indicate a possible back-door entry into the database system, bypassing the controls of the central directory.

The above example illustrates a security policy in which two events, e1 and e2, are correlated in a simple manner. However, when this policy (in the form of query 3.1) needs to be evaluated over a large number of events, a SQL query in a traditional system would result in an inefficient execution.

3.2 Security Event Processing System Using Complex Event Correlation

To illustrate the need for complex correlation between events, consider another example policy that the security alarm system described herein in section 3.1 may need to verify. Suppose that a security policy is defined according to which a user must be locked out after three incorrect passwords are attempted within a span of 60 seconds. The user's account is to be reactivated only after an operator resets the user's password. The security alarm system may be required to verify that this policy has been configured in all systems that provide for user authentication, such as, for example, all database systems in an enterprise.

As in the example described herein in section 3.1, suppose that every user's login to any database system generates an event e1 and that the event that resets the user's password is event e2. An event e3 is generated when a user supplies an incorrect password. According to the techniques described herein, the following query 3.2 can detect all events, e1, which follow three or more occurrences of event e3 within 60 seconds without an intervening event, e2, which resets the user password:

---

Q3.2  e3( ) as a and (count(*) over e3(timestamp between a.timestamp-60
         and a.timestamp, username=a.username)>=2) and
      e1(timestamp>a.timestamp, username=a.username) and
      not exists e2(timestamp between a.timestamp and
         e1.timestamp, username=a.username)

--- where the construct "e3 as a" is used to assign the alias a to event e3. In the above security policy, events e1, e2, and e3 are correlated in a complex manner by using their attributes timestamp and username, and the count( ) window aggregation operation.

Figure 2:
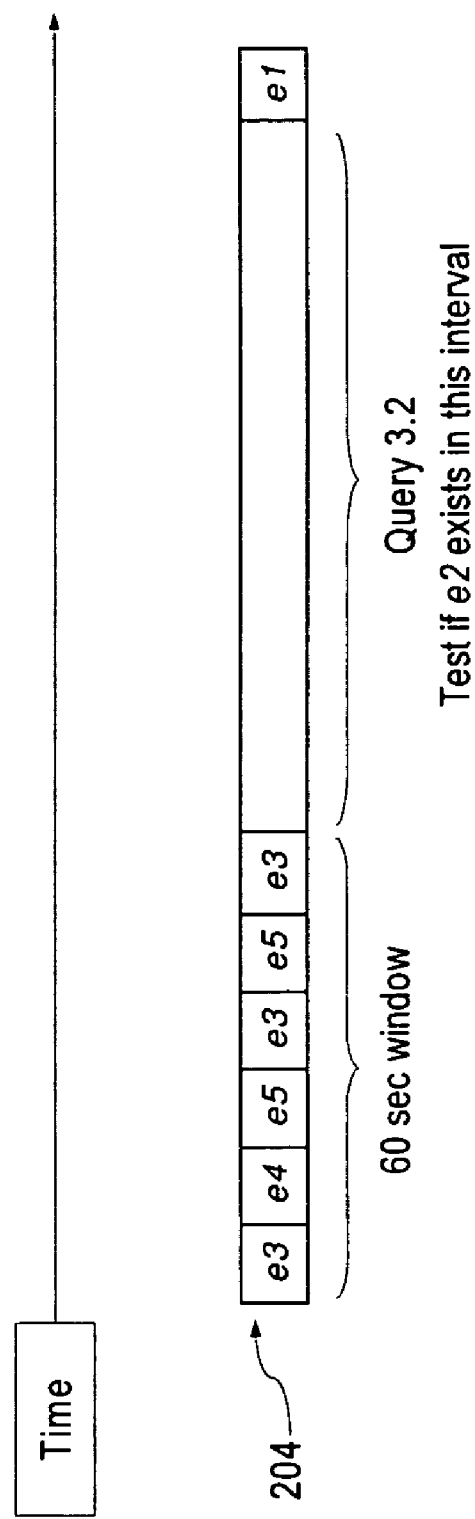
FIG. 2 is a block diagram that illustrates the processing and evaluation of an example query in a security event processing system according to one embodiment.

FIG. 2 illustrates the processing and evaluation of query 3.2. In FIG. 2, a plurality of records 204, which represent a plurality of events, is received and processed by the security alert system or an event analysis engine thereof. If events e3 are received within a 60-second window, then query 3.2 would test whether any event e2 has been received during the time interval that follows. If event e2 is not detected in the interval following the 60-second window, then the security alert system detects that the policy is violated (e.g. that the database system in which the user logged in is not configured to implement the lockout and password-reset policy).

As in the example described herein in section 3.1, evaluating the above policy (in the form of query 3.2) over a large number of events by using a SQL query in a traditional system would also result in an inefficient execution.

3.3 Order Management Event Processing System

Some On-Line Transactional Processing (OLTP) applications, such as order management applications, are configured to process data as a sequence of events ordered by time. A typical lifecycle of an order in such order management system may be: (1) customer places an order; (2) order is sent to manufacturing; (3) manufactured order is placed in a finished goods inventory; (4) order is shipped; and (5) order is invoiced. According to the techniques described herein, each stage in the order fulfillment pipeline may be modeled as a separate event that may be generated and handled by different application modules. In some embodiments, the data records representing these distinct events may be stored in separate relational tables in one or more relational databases.

In a traditional OLTP order management application, an analyst who wants to ask questions such as why a particular order is backlogged would have to resort to a complex transformation of the transaction data into a very wide fact table that is stored in a data warehouse. The fact table that is populated from the transaction data has a separate DATE column for each event of interest. Wide fact tables are typically used because database servers managing data warehouses are efficient at performing intra-row comparisons.

In an Order Management Event Processing System configured according to the techniques described herein, an analyst would be able to execute a query on live, fresh data rather than on a data warehouse fact table that contains historical transaction data. For example, suppose that a policy is defined according to which the analyst needs to be alerted when an order that is sent to manufacturing (event e1) has not been placed in the finished goods inventory (event e2) after 1 day (i.e. 86400 seconds). This policy may be evaluated by executing the following query 3.3:

Q.3.3  e1(timestamp<SYSDATE-86400) and not exists e2(order_id=e1.order_id)

where order_id uniquely identifies an order and SYSDATE is the current wall-clock time.

4.0 Event Definitions and Event Definition Processing

According to the techniques described herein, one embodiment provides a syntax specification for creating event definitions. In this embodiment, the syntax specification is modeled based on a Select-Project-Join (SPJ) data manipulation language. The syntax specification may be used to define queries and other expressions that may be evaluated over records representing various events. In this embodiment, the syntax specification may also be used for organizing the event definitions in three categories: base events, compound events, and logical update events.

4.1 Base Events

A base event definition (also referred to herein as a "base event") specifies conditions for selecting a plurality of events from a stream of received events. According to the techniques described herein, base events are used to organize and store received events into separate categories, where the separate categories are associated with and reflect various rules and policies that govern the received events. Base events defined in an event processing system may be evaluated over a stream of received events in order to select a plurality of events; events in the stream of events that are not selected may be discarded.

In one embodiment, each event is associated with attributes that are populated at the event source system when the event is generated. In this embodiment, an event may be represented as a record which stores the event attributes as columns. In this embodiment, the set of attributes associated with any event may include a timestamp attribute as a mandatory non-NULL attribute. In addition, this embodiment may also provide a user with the capability to design an event schema with other mandatory and optional attributes. The attributes may have standard SQL data types, such as, for example, number, string, and date datatypes.

A base event specifies conditions for selecting events based on their attributes. In a syntax specification according to one embodiment, a base event may be akin to a SELECT condition in a SQL WHERE clause. This syntax specification may also provide comparison operators that are akin to the standard SQL comparison operations =, !=, <, >, <=, >=, in, not in, between, not between. The syntax specification may also provide SQL-like expressions and functions, such as regular expression matches, that can be applied on event attributes. Since timestamp arithmetic is used in event processing, the syntax specification may also provide for addition and subtraction operations of numeric seconds' values on a DATE datatype.

For example, suppose that the events described herein in section 3.2 are associated with an action and a returncode (0=success, -1=failure) attributes. Thus, the base events, e1, e2, and e3 described herein in section 3.2 may be defined as follows:

--- e1 =: action = 'LOGON' and returncode = 0;
e3 =: action = 'LOGON' and returncode = -1;
e2 =: action = 'RESET PASSWORD' and returncode = 0;

---

4.2 Compound Events

A compound event definition (also referred to herein as a "compound event") specifies conditions that correlate multiple base events. According to the techniques described herein, a compound event may be used to represent a policy, where the policy is represented by the correlation conditions specified in the compound event and where the correlation conditions are evaluated to determine whether certain events are in compliance with the policy. In an example event processing system, a stream of events processed by the system may include thousands or even millions of actual events, while there may be hundreds of base events and only tens of compound events defined in the system.

In a compound event, the correlation of a base event with one or more base events that may have happened in the past, or one or more base events that have not yet occurred, may be of interest. According to the techniques described herein, a compound event may be akin to the result of SQL JOIN operations. SQL-like aggregation functions (count, sum, min, max, avg) may be used over a window of events.

For example, the "backlogged-order" query 3.3 described herein in section 3.3 may be expressed as the following compound event:

```
backlogged-order =: e1(timestamp<SYSDATE – 86400) and
              not exists e2(order_id=e1.order_id);
```

In the above example, the expressions within the parentheses, "timestamp<SYSDATE-86400" and "order_id=e1.order_id", are conditions on the attributes e1.timestamp and e2.order_id respectively.

The attributes of a compound event are populated with attributes from the base events specified therein. In the example above, the "backlogged-order" compound event is populated with the attributes from event e1 because there is no ambiguity. This is akin to a SQL SELECT * projection clause. In some embodiments, the provided syntax specification may allow a user to control the values of the attributes specified in the compound event. In addition, the syntax specification may allow compound events to be referenced in other compound event definitions.

4.3 Logical Update Events

A logical update event definition (also referred to herein as a "logical update event") specifies conditions that correlate first one or more events that change the effect of second one or more events that have occurred earlier.

According to the techniques described herein, a logical update event is used to logically represent, and produce the effects of, UPDATE and DELETE operations on events that are stored as an append-only sequence without actually updating or deleting any events stored in the append-only sequence. For example, while events are stored by an event processing system as an append-only sequence, in some situations the generation of a new event may effectively undo the effect of a previous event.

For example, consider the order management event processing system described herein in section 3.3. A data entry error may have incorrectly sent an unfinished order for shipment. The error is later corrected by updating the status of the order. In highly regulated environments, these updates or deletes cannot be performed in-place because, for example, an exact trail of the sequence of changes may be needed. Hence, by using logical update events, the techniques described herein provide a user with the capability to define compensating events that undo the effect of events that appeared earlier in time.

Logical update events may also be needed during a normal course of action. For example, suppose that the security alarm system described herein in section 3.1 monitors accesses to sensitive data. Only privileged users are allowed to access sensitive data. An event e1 is generated when a user is given privileged access. An event e2 is generated when sensitive data is accessed (perhaps by a DBMS that implements database auditing). According to the techniques described herein, a compound event, "break-in" may be defined which flags accesses to sensitive data by unprivileged users:

break-in1=:    e2(    )    and    not    exists
    e1(timestamp<e2.timestamp, username=e2.username);

During the normal course of action, a user's privileges may be revoked. Suppose that an event e3 is generated when privileges are revoked. All events, e2, which occur before the revoke do not qualify for the "break-in" compound event, whereas all events, e2, that occur after the revoke qualify. The following modification would handle changes to user privileges:

```
break-in2 =: e2( ) and ((not exists e1(timestamp<e2.timestamp,
                username=e2.username) or
              (e3(timestamp<e2.timestamp,
                username=e2.username) and
              not exists e1(timestamp between e3.timestamp and
                e2.timestamp, username = e2.username));
```

The above example shows that it is cumbersome for the user to account for deletes and updates in an append-only sequence. Ideally, the user would like to code "break-in1" but the system would produce the same output as "break-in2".

To address this issue, the techniques described herein provide syntax specification according to which the logical update events allow a user to specify compensating events and simplify compound event definition. The following syntax allows a user to specify that an event e3 that appears later in time undoes the latest event e1 that appeared before e3 in the sequence, subject to the join conditions specified within parentheses:

UPDATE e1=: e3(username=e1.username);

According to the techniques described herein, a similar definition can be created to specify that new events have the effect of deleting an earlier event by using the DELETE keyword, for example:

DELETE e1=: e3(username=e1.username);

where event e3 associated with a particular user logically undoes the effect of a previous event e1 associated with the same user.

4.4 Processing Base Events, Compound Events, and Logical Update Events

Figure 3:
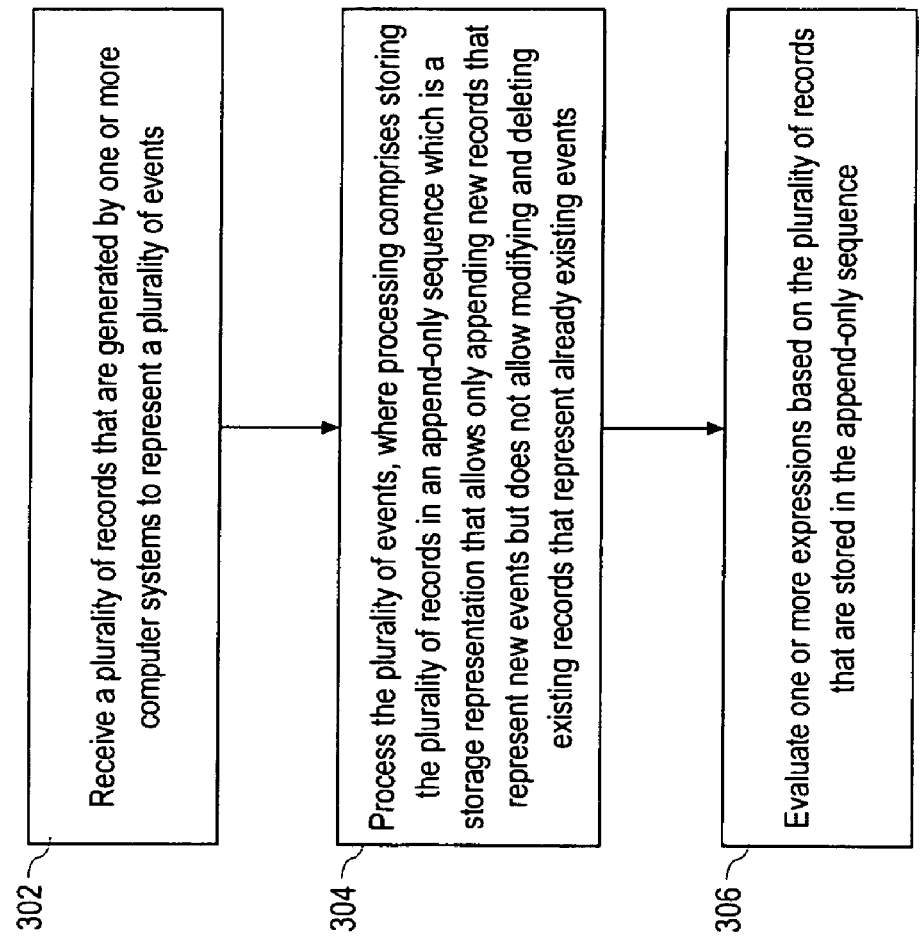
FIG. 3 is a flow diagram that illustrates an overview of a method for processing events according to one embodiment.

FIG. 3 is a flow diagram that illustrates an overview of a method for processing base events, compound events, and logical update events according to one embodiment.

In step 302, a plurality of records is received. The plurality of records represents a plurality of events that are generated in one or more event source systems. For example, one or more event source systems may generate a stream of events that is represented by a stream of records. The plurality of records may be selected from the stream of records by applying a set of base events, where applying the set of base events may include evaluating the conditions specified in the set of base events over the event attributes included in the stream of records.

In step 304, the plurality of events represented by the selected plurality of records is processed. Processing the plurality of events comprises storing the plurality of records in an append-only sequence that allows only appending new records that represent new events but does not allow modifying and deleting existing records that represent already existing events.

In step 306, one or more expressions are evaluated based on the plurality of records that are stored in the append-only sequence. For example, evaluating the one or more expressions may include evaluating a compound event, where the compound event may be representing a policy that is defined to govern the plurality of events. In another example, evaluating the one or more expressions may include evaluating a logical update event, where the logical update event may be defined to determine whether an event changes the effect of another event that has occurred earlier.

5.0 Storage of Event-Generated Data 5.1 Columnar Storage of Event Attributes

In one embodiment, raw event data from a stream of received events is stored as a single very large append-only table. For example, each event selected from the stream of events may be represented by a record that can be identified by an index into this table. This index may be akin to a SQL ROWID, except that event indices are never reused. The event attributes are stored in a storage structure in columnar format, where attributes for particular events may be indexed by the index values associated with the corresponding records.

For example, in one embodiment each column storing event attributes may be a separate OS file. In another embodiment, each column storing event attributes may be stored as a Binary Large Object (BLOB) column of a table in a database. No UPDATE or DELETE operations are allowed on the columns in the columnar attribute storage structure. Hence, the page format for the columnar attribute storage structures are simple and the attribute values are densely packed. The event attributes are accessed sequentially from the column attribute storage structures and one attribute at a time. In doing so, the event attributes may be mapped to volatile memory in a native array format.

5.2 Array Indexes for Base Events and Compound Events

In one embodiment, base event definitions are evaluated before the raw event data (which comes as a stream of events from various event source systems) is stored persistently in a columnar attribute storage structure in column format. This evaluation yields a set of indices for each base event. In the example illustrated in FIG. 2, base event e3 would have indices 1, 4, and 6, and base event e1 will have the index of the last row in the illustrated sequence. The list of event indices, which are in ascending order, is stored sequentially into an append-only file for each base event. As with event attributes, in some embodiments the base event indices may be stored in a BLOB column of a table in a database. The base event index identifying a plurality of selected events is also append-only and may be densely packed with index values. The base event index may be sequentially accessed by mapping the index to volatile memory in a native array format.

In one embodiment, compound event indices are stored in the same format as the base event indices. Compound events are evaluated by using as input the base event indices and the plurality of records that represent the plurality of selected events.

5.3 Modification Lists for Logical Update Events

In one embodiment, after the base events are evaluated, and before the compound events are evaluated, a modification list of indexes is determined that identifies events which change the effect of (e.g. that logically update or delete) earlier events. In this embodiment, a separate modification list of indexes is generated and stored for each logical update event. Each logical update event definition specifies a sequence join between a base event in the input sequence and all the earlier base events. When evaluated, a logical update join may result in two events for each join result. In each join result, one of the events is the event that logically updates a previous event, and the other event is the event that is logically updated. For each event that logically updates a previous event, the previous event is the most recent of possibly multiple previously occurring events of the same type. In the example described herein in section 4.3, the logical update definition is a join between base event e3 and base event e1. If the join finds a match when evaluated, the result is a pair of two indices—the index of the new event (e3) and the index of the most recent previously-occurring event that is being updated (e1). These two indices are stored as a 2-column array of numbers. The index of the new event is strictly ascending whereas there is no ordering for the index of the updated event.

Figure 4:
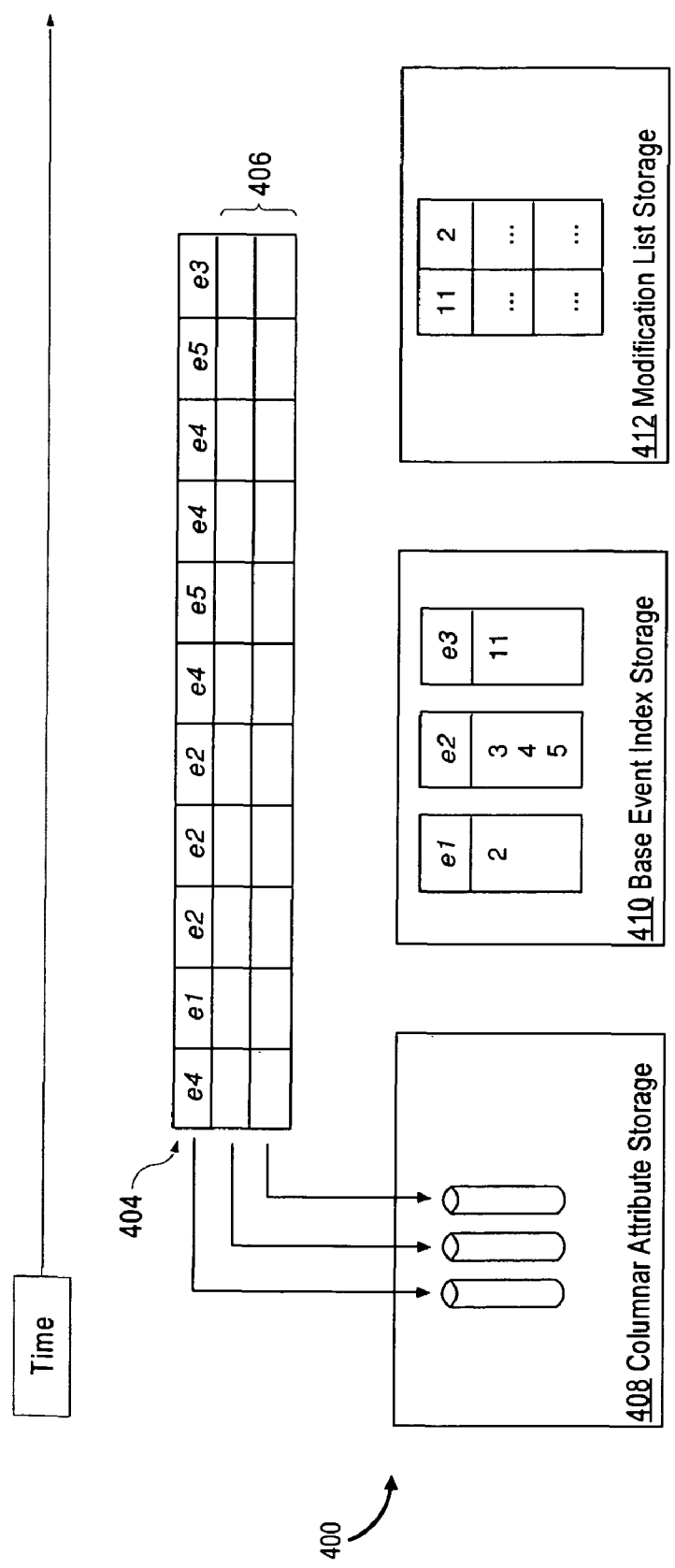
FIG. 4 is a block diagram that illustrates storage structures for storing and indexing events according to one embodiment.

FIG. 4 is a block diagram that illustrates storage structures for storing and indexing events according to one embodiment. In FIG. 4, reference numeral 400 indicates columnar attribute storage 408, base event index storage 410, and modification list storage 412. Columnar attribute storage 408 includes one or more columnar attribute storage structures for storing one or more attributes of a plurality of events. Base event index storage 410 includes one or more index storage structures for storing the indices that identify the plurality of events stored in column format in columnar attribute storage 408. Modification list storage 412 includes a separate modification list storage structure for each logical update event defined in the event processing system.

In FIG. 4, the plurality of records 404 represents a plurality of events which have been selected from a stream of events received from one or more event source systems. Reference numeral 406 indicates that each record representing an event of the plurality of events may include one or more attributes associated with the corresponding event. For example, each record in the plurality of records 404 includes three attributes that are associated with the corresponding event. When the plurality of records 404 is processed, the event attributes are stored as three separate columns in columnar attribute storage 408. The indices associated with the plurality of records 404 are stored in base event index storage 410. (FIG. 4 depicts the base event indices only for events e1, e2, and e3.) Modification list storage 412 includes a modification list that is associated with a logical update event definition, according to which event e3 changes the effect of (e.g. logically updates or deletes) a previously received event e1. For example, the modification list depicted in modification list storage 412 includes one entry which indicates that event e3 at index 11 updates event e1 at index 2.

5.4 Purging Events from an Event Processing System

In some embodiments, the stream of events received at an event processing system may include a large number of events. If a lot of types of events are of interest to the event processing system (e.g. if there are many base events, compound events, and logical update events defined in the system), the system may not have enough physical storage space to store all received events indefinitely. Thus, in these embodiments the techniques described herein may provide mechanisms for eventually purging stored events or for migrating stored events to tertiary storage. In addition, in some embodiments purging of events may also be needed to maintain an upper bound on the worst-case evaluation time of queries that are being evaluated against the stored events.

In one embodiment, historical events may be purged based on time ranges. In this embodiment, old events may be purged in large batches to simplify garbage collection of storage space. An entire file (or BLOB) containing events older than a user specified date may be deleted, rather than individual events, in order to preserve the append-only principle according to which the events are stored and maintained. This allows for storing event information in Write-Once-Read-Many-times (WORM) devices. In some operational scenarios, the purging mechanisms may provide for storing some events permanently. For example, events that capture metadata changes (e.g. event e2 described herein in section 3.1) may need to be retained permanently.

6.0 Continuous Event Processing

In one embodiment, an event processing system may evaluate and process events and queries in three phases: (1) evaluation of base events over input event data based on a set of base events; (2) determining if any earlier event is updated or deleted by the arrival of a new event based on a set of logical update events; and (3) evaluation of compound events by joining multiple base event sequences after factoring in updates and deletes stored in the modification lists of the set of logical update events.

6.1 Array Evaluation of Base Events

Figure 5:
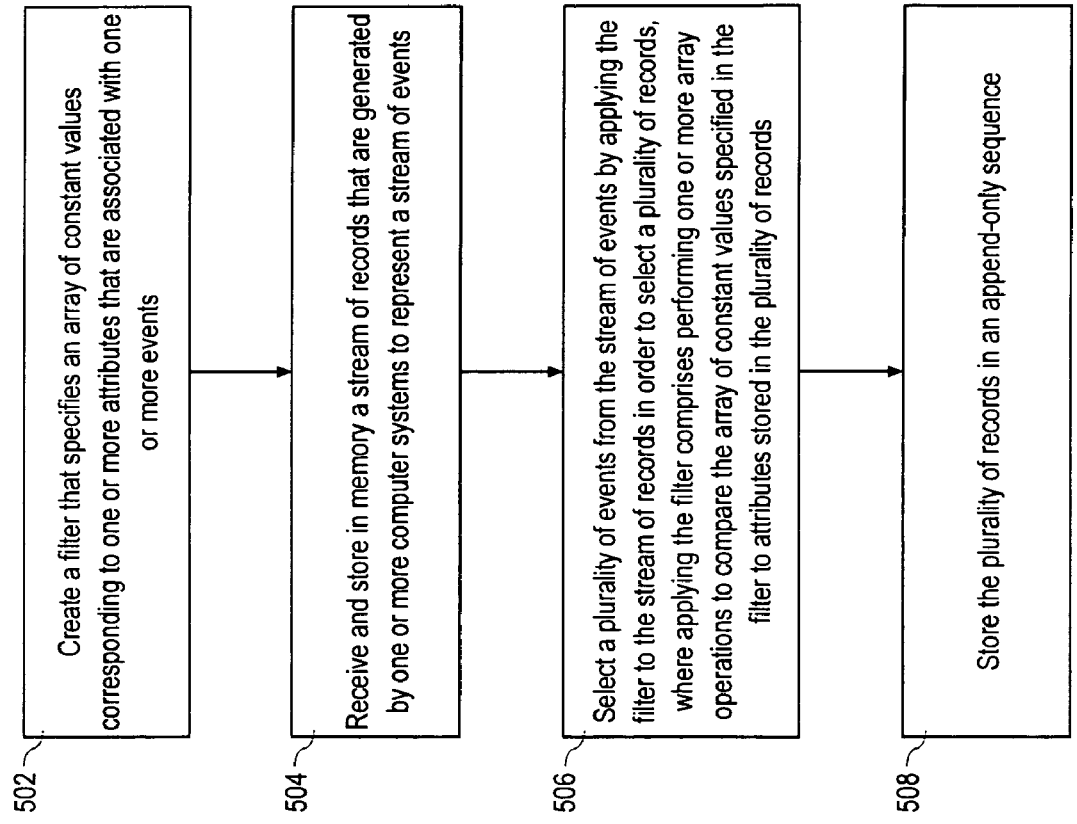
FIG. 5 is a flow diagram that illustrates an overview of a method for processing and evaluating base events according to one embodiment.

FIG. 5 is a flow diagram that illustrates an overview of a method for processing and evaluating base events according to one embodiment.

In step 502, a filter for simultaneous processing and evaluation of multiple events is created. The filter specifies an array of constant values corresponding to one or more attributes that are associated with one or more events.

In step 504, a stream of records is received and stored in memory. The stream of records is generated by and received from one or more event source systems to represent events that have occurred in these systems.

In step 506, a plurality of events is simultaneously selected from the stream of events by applying the filter to the stream of records. Applying the filter to the stream of records results in the simultaneous selection of a plurality of records that represent the plurality of events being selected. In this embodiment, applying the filter comprises performing one or more array operations to compare the array of constant values specified in the filter to attributes included in the plurality of records. In step 508, the selected plurality of records is stored as an append-only sequence.

In one embodiment, base events are evaluated as the stream of events is received at the event processing system. The base event definitions are compiled and an attribute filter is created for a subset of the event attributes. An attribute filter is a two-dimensional array, where the first column stores a constant value known at compile-time and the second column is a list of base event definitions that must have the constant value for said attribute. The attribute filter narrows down the set of base event definitions that need to be evaluated for each input record that represents an event in the stream of received events.

For example, consider an event schema that has four attributes w, x, y, and z, where x and y are declared to be NOT NULL. Consider the following four base event definitions:

```
e1 =: x=1 and y <= 'foo' and regexp_like(w, 'a. *b);
e2 =: x=2 and y in ('foo', 'bar', 'foobar') and length(w)<z;
e3 =: (x=1 or x >5) and y='foobar';
e4 =: z=3 and y='foobar';
```

The attribute filter over the above four base events for attribute x contains 3 rows, corresponding to the constant values 1, 2 and a wild-card value—(1, (e1)), (2, (e2)), (*, (e3, e4)). The attribute filter for attribute y contains 4 rows, corresponding to the constant values 'foo', 'bar', 'foobar', and a wild-card value—('foo', (e2)), ('bar', (e2)), ('foobar', (e2, e3, e4)), (*, (e1)).

In this embodiment, attribute filters are built for all NOT NULL attributes. Array operations are used to compare the attribute value in each of the input records with the constant values in the attribute filters. This process is repeated for all attributes that have filters and an array set intersection operation is performed to determine the set of potential base event definitions for each input record.

To illustrate this process, suppose that the input is the following sequence of 4 records, where each record contains the values for attributes x, y and z in columns 1, 2 and 3 respectively:

(1, 'foo', NULL), (2, 'foobar', 3), (8, 'bar', 1), (2, 'bar', NULL).

An array comparison operation is performed of the attribute x in all 4 input records with the constant values of the above-described attribute filter for x (the wild-card matches all values). This results in the following two-dimensional output where each set represents the set of potential base events for the corresponding input record:

(e1, e3, e4), (e2, e3, e4), (e3, e4), (e2, e3, e4).

Performing the same operation on attribute y in all 4 input records with the above-described attribute filter for y yields the following result:

(e1, e2), (e1, e2, e3, e4), (e1, e2), (e1, e2).

Applying an array set intersection operation over the above two arrays of sets produces the list of candidate (or potential) events that need to be evaluated for each record:

(e1), (e2, e3, e4), ( ), (e2).

Once the potential set of base events has been computed, array evaluation operations are performed to determine the exact set of base event indices. For each base event, the sequential list of input record indices that need to be evaluated is determined. In the above example, the list of input record indices for event e1 is (1), for event e2 is (2, 4), for event e3 is (2) and for event e4 is (2). The columns referenced in the event definition are loaded into arrays, and array operations are performed to evaluate the base event definition for all candidate records simultaneously. In the above example, columns w and z of rows 2 and 4 are loaded before evaluation of the rest of the definition of event e2. Columns y and w are loaded before evaluation of the rest of the definition for e1. Event e4 does not need further evaluation.

Boolean comparison operations and simple arithmetic operators (e.g. =, !=, <, >, between, in, +, −, etc.) have obvious array operation equivalents. Some functions (e.g. regexp_like, which looks for a regular expression match) may not have array operation equivalents. For some of these expensive operations, the unique list of arguments may be computed first, the functions for the unique arguments may then be evaluated, and the result for each record may be sequentially looked up from the result cache.

Even though a series of array operations may perform several redundant computations, the technique of utilizing array operations described above is very efficient. For example, the value of x in the input records is compared with all the constant values in the attribute filter, even though a value of x in a single input record can match only one of the constant values. Similarly, by evaluating the base event definition for all input records in a single sweep a short-circuit evaluation is not performed. However, as long as the event data for the stream of received events fits in a cache or other portion of volatile memory, array operations are efficient because constant branching is avoided and memory is accessed sequentially.

6.2 Evaluation of Logical Update Events

Logical update events may be considered as a simple special case of compound events. In order to evaluate a logical update event, in one embodiment, all records, in the stream of input records, whose base event evaluations match the right-hand side (RHS) of the logical update event definition are considered. For all such input records that potentially change the effect of an earlier event, a join is performed with the records that match the left-hand side (LHS) of the logical update event definition and appear earlier in the stream of events and/or in the append-only sequence that stores records representing previously received events. The latest record in the generated result set represents the event that is being logically updated. The indices of the input record and of the record representing the last event (i.e. the event being logically updated) are appended as an entry to the modification list of index values associated with the logical update event being evaluated. The logical update event definition is evaluated in an N*M array join over all input records that match the RHS with all the base events of the LHS, where N is the number of base events of the LHS, and M is the number of input records that map to the base event in the RHS.

For example, the logical update event described herein in section 4.3 is equivalent to the following sequence join, where u is the event that is being updated:

e1( ) as u and e3(username=u.username, timestamp>u.timestamp) and
    not exists e1(username=u.username,
        timestamp between u.timestamp and e3.timestamp)

6.3 Evaluation of Compound Events
6.3.1 Splitting Sequences of Events into Parallel Tracks In one embodiment, the equi-join conditions between the base events that are specified in the compound event definition are analyzed. (As used herein, "equi-join condition" refers to an equality condition that is included in a join predicate or clause.) Based on the analysis, a maximal composite partitioning key is computed. The maximal composite key is defined as the longest equi-partitioning key. Ties between key candidates are resolved in favour of keys that split the most number of events. For illustration, consider an event schema with four attributes, w, x, y and z. Consider the following compound event definition:

e1( ) and
e2(x=e1.x, y=e1.y, z=e1.z, w=...) and
e3(x=e1.x, y=e1.y, z=e1.z, w<...) and
e4(x=e1.x);

The maximal composite partitioning key for the above compound event is "x,y,z". In order to evaluate the above compound event in an efficient manner, each of the base event indices for e1, e2 and e3 are split into parallel tracks based on this composite key. Each base event is processed in turn, and the partitioning columns from the columnar attribute storage structures for the base event indices are sequentially loaded for evaluation. The single sequence of ascending base event indices is then split into parallel tracks, where each track represents an ascending sub-sequence of indices that have a single unique value of the composite key "x,y,z". This procedure is similar to hash joins except that more than two events are partitioned and all the base event indices of any un-partitioned event (e4 in the above example) are fed into the sub-sequences represented by the parallel tracks.

Figure 6:
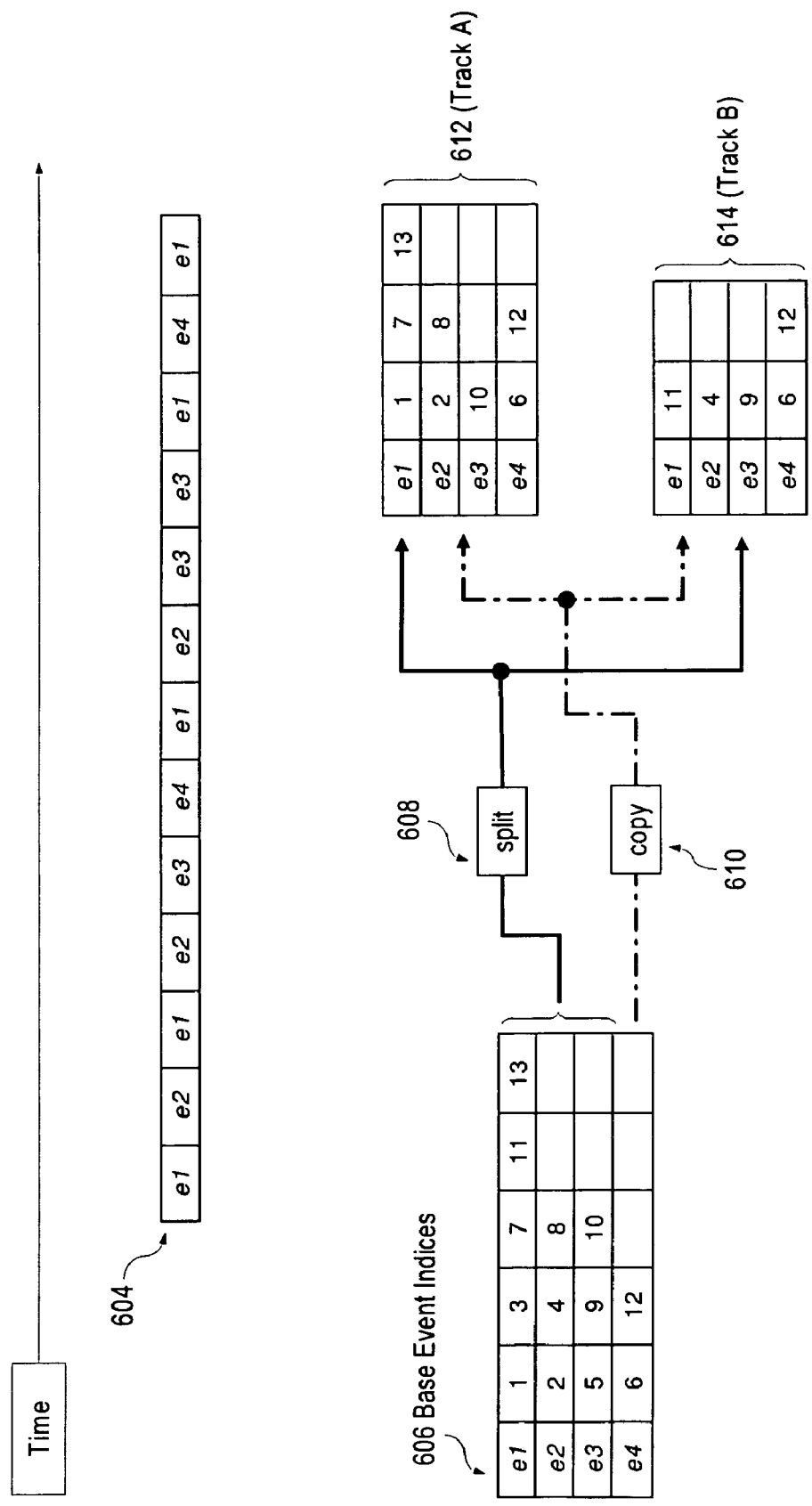
FIG. 6 is block diagram that illustrates the processing and evaluation of an example compound event according to one embodiment.

FIG. 6 is block diagram that illustrates the processing and evaluation of the above compound event in an example operational scenario. The sequence of records 604 represents a sequence of events over which the above compound event needs to be evaluated. In some embodiments, the sequence of records 604 may be retrieved from an append-only sequence that stores records representing already received events. In other embodiments, the sequence of records 604 may be retrieved from the plurality of records that have been selected from a stream of events received at an event processing system by evaluating a set of base events. The base event indices structure 606 stores the index values identifying the records in the sequence of records 606. Split operation 608 and copy operation 610 are performed on the base event index values stored in the base event indices structure 606. As a result, the sequence of events represented by sequence 604 is split into sub-sequences 612 and 614 that correspond to parallel tracks A and B, respectively.

The procedure for splitting the sequence of events represented by the sequence of records 604 in FIG. 6 may be as follows. The base event indices for e1, e2, and e3 are split into parallel tracks A and B based on the values of x, y, and z. If a track does not have event indices from all the base events, and the base events that do not have event indices are not within a NOT EXISTS clause, the track may be immediately discarded. In the example of FIG. 6, indices 3 and 5 belong to a track with no corresponding values from e2 and are therefore discarded. The base event indices for the un-partitioned event e4 are logically copied by copy operation 610 to both sub-sequences 612 and 614 for further join processing.

By splitting a sequence of events into parallel tracks, the techniques described herein reduce the number of event combinations that need to be processed by close to one order of magnitude. For example, as illustrated in FIG. 6, instead of evaluating $13^2=169$ event combinations, only 89 ($8^2=64$ for track A plus $5^2=25$ for track B) event combinations need to be processed.

In some embodiments, a two-level partitioning scheme may result in better performance than the one-level partitioning scheme illustrated in FIG. 6. Using the example compound event described above, all event indices, e1, e2, e3, and e4 may first be split based on the attribute x. Within each first-level partition the event indices for e1, e2 and e3 may be further split based on a secondary partition key "y, z" and the indices for e4 that belong to that partition may be copied into the resulting parallel tracks. In some situations, such as when there is an EXISTS or NOT EXISTS condition specified in the compound event being evaluated, such conditions may be evaluated before copying the event indices into each parallel track.

Similarly to SQL optimisers, any SELECT conditions may be first applied on the base event indices. In some embodiments, SELECT conditions may be avoided in compound event definitions. For example, it may be more efficient to define the base events in such a way that the common SELECT conditions among these base events are evaluated as the stream of input events enters the event processing system.

In some embodiments, the maximal partitioning keys may be chosen to minimize the number of records that that have to be joined within each track. Such strategy may be beneficial because the base events specified in a compound event definition tend to be threaded by a unique key.

The technique described herein for processing a sequence of records by splitting the sequence into separate parallel tracks is not limited to sequence of records that represent events. Rather, this technique is generally applicable to evaluating an N-way join of N different sets of records based on some equality correlation conditions and/or some non-equality correlation conditions. For example, in one embodiment a plurality of correlation conditions may be defined in an N-way join of multiple sets of records. The plurality of correlation conditions may be defined over a group of attributes from any and/or all of the records in the multiple sets. According to the technique described herein, the plurality of conditions specified in the N-way join is analyzed. Based on the analysis, a maximal partitioning key for the N-way join is determined. (In some embodiments, the records of the multiple sets may be optionally ordered in a single sequence of records according to pre-determined criteria. The pre-determined criteria may be, for instance, the time at which a record is received and/or stored. In these embodiments, ordering the records into the sequence may also comprise generating a unique index of ascending or descending values to identify each record in the single sequence.) The multiple sets of records are then automatically split into two or more sub-sequences based on unique values stored in the maximal partitioning key attributes of the records in the multiple sets. Automatically splitting the sequence into the two or more sub-sequences may comprise storing values from the maximal partitioning key attributes into each sub-sequence in order to identify all records that are included in that sub-sequence. The two or more sub-sequences of records are then processed in parallel. Processing the two or more sub-sequences in parallel may comprise evaluating one or more correlation conditions separately for each sub-sequence.

Figure 7A:
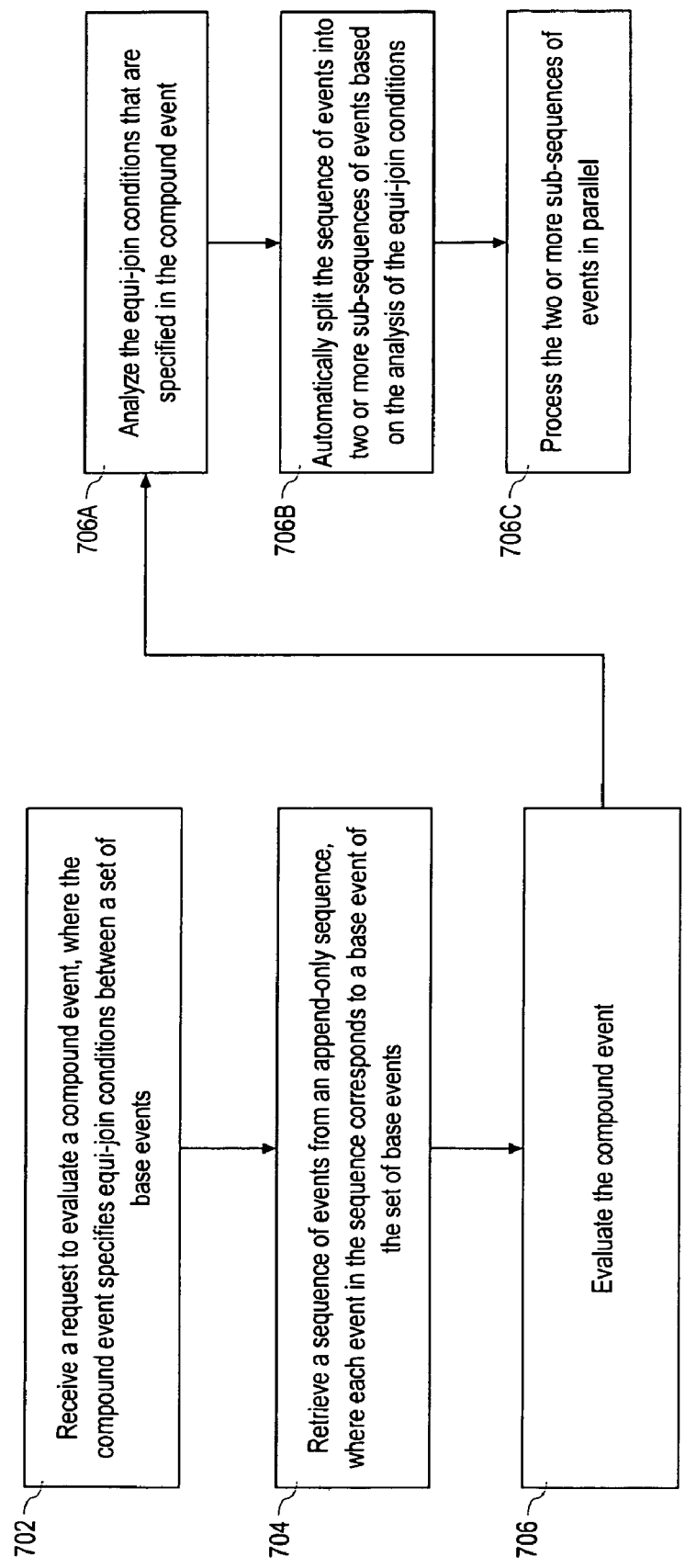
FIG. 7A is a flow diagram that illustrates an overview of a method for processing and evaluating compound events according to one embodiment.

FIG. 7A is a flow diagram that illustrates an overview of a method for processing and evaluating compound events by splitting event sequences into parallel tracks.

In step 702, a request to evaluate a compound event is received. The compound event specifies one or more equi-join conditions between a set of base events. In some embodiments, the request may be a query received from a user that includes the compound event definition. In other embodiments, the request may be automatically generated by the event processing system as part of the continuous evaluation of compound events that are associated with policies defined, and configured for evaluation, in the event processing system.

In step 704, a sequence of events is retrieved, where each event in the sequence corresponds to a base event of the set of base events. In some embodiments, the sequence of events may be represented by a sequence of records that are stored in an append-only sequence. In other embodiments, the sequence of events may be represented by a sequence of records that are retrieved from the plurality of records that have been selected from a stream of events received at the event processing system by evaluating the set of base events.

In step 706 the compound event is evaluated. Evaluating the compound event comprises at least sub-steps 706A, 706B, and 706C, or equivalent steps thereof. In step 706A, the equi-join conditions specified in the compound event are analyzed. Based on the analysis of the equi-join conditions, in step 706B the sequence of events is automatically split into two or more sub-sequences of events. In step 706C, the two or more sub-sequences of events are processed in parallel.

6.3.2 Optimizing for Timestamp-Based Join Conditions

In some embodiments, most compound event definitions may specify conditions for timestamp-based ordering of base events. If it is assumed that the wall-clock time at a given event source system is increasing, the base event indices identifying base events from the same event source system would already be sorted by timestamp. This condition may be detected by allowing a user to flag an event's attribute that is a unique source identifier for events generated by a particular event source system. If the source identifier is used in a join condition across the events being joined, an ordering of base event indices would also order the corresponding base events based on timestamp. In these embodiments, timestamp event attributes may be stored as numeric values so that native comparison operations can be used.

In some embodiments, a compound event definition may be converted at compile time into disjunctive normal form (DNF) so that events are joined using only AND conditions. (This may not be a DNF in the strict sense because OR conditions whose operands come from the same event may be allowed to exist within a DNF; however, using DNF avoids dealing with OR operators in the join tree.) The timestamp-based join conditions are then analyzed at compile time to determine whether any orderings exist. In the example described herein in section 3.2, the following ordering between the events can be determined at compile time:

$a < e3 < e2 < e1$.

Compile-time-determined orderings allow to efficiently compute many timestamp-based join conditions that are specified in compound events. Using array operations, a two-dimensional result bitmap may be generated that indicates the ordering between all the event indices of two events in a single operation.

In some embodiments, event definitions may be transformed to optimize for event patterns that use EXISTS and NOT EXISTS clauses. In the example described herein in section 3.1, the event definition may be transformed to determine the first occurrence (if any) of e2 in a sub-sequence parallel track and to return all event indices for e1 that appear before e2 in timestamp order. In the example described herein in section 3.2, the event indices for e3 may be filtered based on the result of the COUNT window aggregation. For each remaining e3 event index value, the first occurrence (if any) of e2 may be determined and all event indices for e1 that appear before e2 in timestamp order may be returned.

In some embodiments, join conditions that are not timestamp-based may be evaluated as two-way joins between events. According to the techniques described herein, the array operation language supports built-in array operations for up to two operands. In other words, the operation "A×B" may be performed, where x is any operator that takes two operands (e.g., =, >, +, etc.) to "join" arrays A, B in a single operation. If an operator involves event attributes from N events (where N>2), the techniques described herein provide for iterating over all values for the N-2 event indices and performing the join of the first two event indices in a single operation. BETWEEN and NOT BETWEEN array operators, which may be used in comparing timestamp event attributes, may be handled by using specifically developed code.

In one embodiment, a timestamp-based optimization may provide for generating an additional event that is not among a stream of events that is received at an event processing system from one or more event source systems. For example, a particular compound event may be analyzed to determine whether evaluating an additional event would be more efficient than continuously evaluating the compound event. If such additional event may be determined and defined, the additional event may be scheduled for evaluation and/or evaluated by the event processing system instead of the continuous evaluation of the particular compound event.

For example, suppose that a compound event is defined to enforce compliance with a policy according to which "a root password must be changed within one day after an administrator leaves the company". An additional event for this compound event may be defined as "check whether the root password was changed", where the additional event may be scheduled for evaluation 24 hours after receiving an event indicating that an administrator has left the company. According to the techniques described herein, instead of continuously evaluating the compound event, the compound event is first analyzed in response to receiving an event indicating that a particular administrator has left. The additional event ("check whether the root password was changed") is then determined and defined in the event processing system. Thereafter, the additional event is scheduled for evaluation in the future, where the future scheduled time (e.g. 24 hours) depends on the analysis of the compound event. In this way, the techniques described herein may avoid costly continuous evaluation of a compound event when the conditions specified in that compound event indicate that an additional event may evaluated in a less expensive way.

6.3.3 Processing Logical Update and Delete Operations

According to the techniques described herein, records representing events are stored in append-only sequences. Yet the techniques described herein correctly reflect the effect of logical update and delete events when the techniques are implemented to answer user queries. For example, consider the following logical update event (which declares that event e3 has the effect of deleting event e1) and the subsequent query 6.3.3:

```
            DELETE e1( ) =: e3( );
Q6.3.3  e2( ) and exists e1(timestamp<e2.timestamp);
```

Suppose also that the following events are received in sequence:
e1, e2, e3, e2.

When query 6.3.3 is evaluated, the query must return only the first e2 event in the sequence because an event e1 is not received prior to the second e2 event. (An event e1 is not received prior to the second e2 event because the intervening event e3 has effectively deleted the effect the first-received event e1.)

In order to evaluate queries such as query 6.3.3, in one embodiment the modification list of index value for a particular logical update event is used to create "barriers" in each parallel track of sub-sequences. A barrier is created at every index value that identifies an event that logically updates or deletes an earlier event. Using array operations, the barrier points can be quickly determined given a set of event indices. All event indices are then filtered through the modification list to remove those indices that have been updated or deleted by an event index value that exists between them and the barrier. This mechanism correctly handles multiple updates to the same base event. A query evaluating a logical update event based on such barriers would return the same result as the result that would have been returned if the query were executed just before each logical modification to an earlier event.

6.3.4 Evaluating Logical Update Events that Affect Compound Events

In some embodiments, the techniques described herein provide for determining whether any compound event expressions that have been previously computed are now no longer TRUE because of the arrival of new events that logically update (e.g. change the effect of) an event or events that are referenced in the compound event. This is because, while logical update events are specified as logically updating or deleting base events, some logical update events may also affect compound events.

For example, consider the following compound event e6:
e6( )=: e1( ) and e2(username=e1.username);

Suppose that an event e1 arrives and is stored at index value 10 in the append-only sequence, and that an event e2 arrives and is stored at index value 20 in the append-only sequence. Suppose that when compound event e6 is evaluated, events e1 at index value 10 and e2 at index value 20 join over (e.g. have the same value in) their username attributes. Suppose also that compound event e6 evaluates to TRUE at the point in time at which event e2 is stored at index value 20.

Assume that the following logical update event is also defined:
DELETE e2( )=: e3(username=e2.username);

Suppose now that an event e3 arrives and is stored at index value 30 in the append-only sequence, and suppose that this event e3 logically deletes event e2 that is stored at index value 20 (e.g., event e3 at index value 30 joins event e2 at index value 20 over the username attribute). Thus, the event processing system needs to record that compound event e6 was TRUE between the times at which event e2 arrived at index value 20 and event e3 arrived at index value 30, but FALSE after that. (It is also noted that compound event e6 can become TRUE again for event e1 at index value 10 and another event e2 that is stored at index value 40 if, for example, the event e2 arrives at index value 40 and joins with event e1 at index value 10 over the username attribute.)

Correctly evaluating logical update events that affect compound events is necessary not only to correctly report when a compound event was TRUE and when it was FALSE in the input sequence, but also to correctly evaluate other compound events that may reference this compound event. For example, suppose a compound event e7 is defined to reference the above compound event e6 as follows:
e7=: e5( ) and EXISTS e6(username=e5.username);

In order to correctly evaluate compound event e7, the event processing system needs to know at which points in the append-only sequence compound event e6 was TRUE and at which points it was FALSE.

It is noted that in the above examples compound events e6 and e7 are rather simple. However, the same event evaluations would need to be performed if other, more complex correlation conditions are used to define compound events. For example, a new event may logically update the username attribute of event e2, and thus cause the join condition for compound event e6 to become FALSE. In another example, if a COUNT( ) operator is used to specify the number of events in a compound event definition, the condition based on the COUNT( ) operator may become FALSE if an event included in the compound event definition becomes FALSE.

Correctly evaluating logical update events that affect compound events is difficult because a compound event definition can have complex correlations (e.g. using COUNT( ) operators as part of the conditions) and can have references to several events, and because it may not be feasible to maintain a list of all the event indices that matched the correlation conditions of a compound event. Thus, an event processing system should be able to efficiently determine whether a compound event that had previously evaluated to TRUE for a given set of indices is no longer TRUE, even when it is not feasible to maintain a list of event indices that match the correlation conditions for each of the dependent events in a compound event. (In the examples above, the dependent events for compound event e7 are events e5 and e6, and the dependent events for compound event e6 are e1 and e2.)

To address this issue, in one embodiment the techniques described herein provide for determining, for each compound event, the interval (i.e. the range of indices in the append-only sequence) where the compound event is TRUE and where it is FALSE.

Figure 7B:
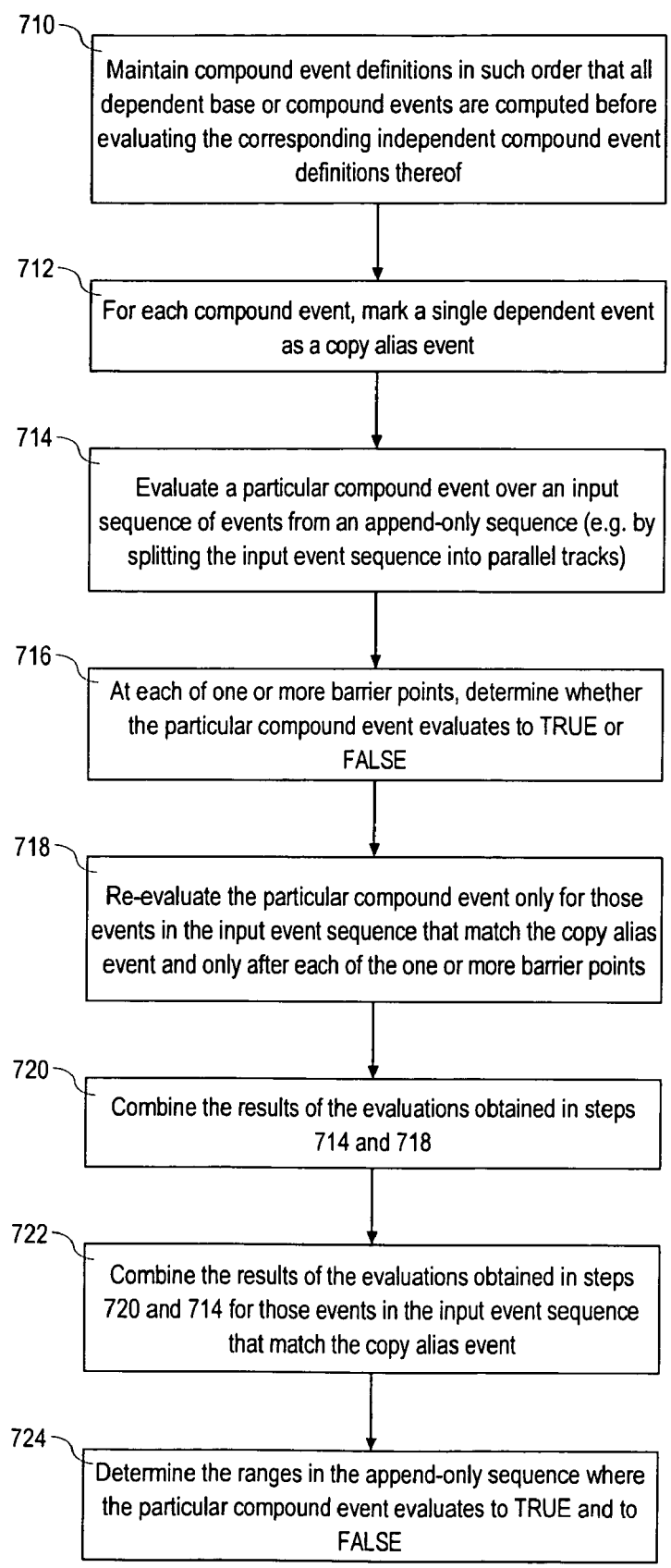
FIG. 7B is a flow diagram that illustrates an overview of a method for evaluating logical updates/deletes of compound events according to one embodiment.

FIG. 7B is a flow diagram that illustrates an overview of a method for evaluating logical updates/deletes of compound events according to one embodiment. In this embodiment, a compound event affected by a logical update event may be evaluated by performing the following steps.

1. In step 710, the compound event definitions maintained in the event processing system are ordered in such way that all dependent events and their modification lists are computed before evaluating a compound event definition. It is noted that the dependent event of a compound event may be a base event or another compound event.
2. In step 712, for each compound event, a single dependent event is marked as the "copy alias" event. A copy alias event may be specified in a compound event definition by a user. If a copy alias event is not specified by the user, then the first event that appears in all the DNFs (Disjunctive Normal Forms) of the compound event definition that is not within an EXISTS, NOT EXISTS, or aggregation clause may be used as the copy alias event. In the examples described above, either event e1 or event e2 may be used as the copy alias event for compound event e6; event e5 has to be used as the copy alias event for compound event e7 because compound event e6 is included within an EXISTS clause. In general, the most selective event (i.e. the event that has the fewest number of matches in the input sequence) should be used as the copy alias event for a given compound event definition.
3. In step 714, a particular compound event may then be evaluated as described herein in section 6.3.1.
4. In step 716, the event processing system has already stored the list of event indices that match the copy alias event for the particular compound event, and the system knows that for each of these indices there are other events that match the other dependent events and also match the correlation conditions. It is noted that unless the copy alias event is a unique last event in the particular compound event definition, some of the event indices may be before the sequence marker and some may be after the sequence marker (i.e. in the fresh set of events that are being evaluated). Additionally, because the particular compound event has been evaluated at various barriers (e.g., as described herein in section 6.3.3), the event processing system has also recorded the points in the event sequence at which the particular compound event has evaluated to TRUE. (It is noted that barriers are those points in the event sequence where a logical update or a logical delete of any of the dependent events in the sub-sequence or parallel track have been recorded.) Because the compound event definitions were ordered in the above step 1 (i.e. step 710 of FIG. 7B), the modification lists have been determined for both the base events as well as the compound events that are the dependent events for the particular compound event that is being evaluated. For instance, with respect to the example described earlier in this section, when compound event e7 is evaluated, the event processing system must have already computed the modification list for the dependent event e6 that is also a compound event.
   At the end of this step, the event processing system still does not know the points in the new sequence of events at which the compound events evaluated to FALSE. These points are referred to herein as the "undo" points. The event processing system needs to determine the list of undo points that includes both the points in the new events sequence at which the compound event evaluated to TRUE in the current evaluation as well as the points before the sequence marker at which the compound event evaluated to TRUE in previous iterations. The list of undo points is obtained in the steps that follow.
5. In step 718, the DNF of the particular compound event is reevaluated like in the above step 3 (i.e. step 714 of FIG. 7B) with the following differences:
   a. The list of candidate event indices for the copy alias event are restricted to the list of event indices that have matched the compound event. This list is typically several times smaller than the list of candidate event indices considered in step 3 because in step 3 all the event indices that map to the copy alias event are considered and evaluated to determine whether they join with other dependent events based on the correlation conditions. In the present step, of interest are only those event indices that are known to have matched with dependent events—and those event indices form a much smaller set.
   b. The compound event definition is evaluated after each barrier within each sub-sequence or parallel track. In the evaluation of the particular compound event as performed in step 3 (see section 6.3.1), the compound event definition is evaluated before each barrier within each sub-sequence or parallel track.
6. In step 720, the results from the evaluations in the above steps 3 and 5 (i.e. steps 714 and 718 of FIG. 7B) of the DNFs of the particular compound event are then combined. The particular compound event is TRUE at a point in the input sequence if at least one of the DNFs evaluates to TRUE at that point (the DNFs, by definition, are connected by OR conditions).
7. In step 722, the results from the above step 6 (i.e. step 720 in FIG. 7B) are combined with the results obtained in the above step 3 (i.e. step 714 of FIG. 7B) for those copy alias event indices that matched in the current iteration (i.e. after the sequence marker) and for the copy alias event indices that matched the compound event in previous iterations (i.e. before the sequence marker).
   For example, assume that the sequence marker is at index value 100. Assume also that a compound event whose copy alias event index is at value 110 evaluated to TRUE (implying that at least one of the DNFs evaluated to TRUE) before barriers at index values 120, 130, 140, and that another compound event whose copy alias event index is at value 10 evaluated to TRUE before barriers 125, 135, 145. The barriers are different in this example because the assumption is that the two events at index value 10 and at index value 110 are in different sub-sequences or parallel tracks. If these two events were mapped to the same sub-sequence, then the list of barriers would have been the same.
   In step 5 (i.e. step 718 of FIG. 7B), the candidate indices for the copy alias event will be only 10 and 110. Assume that in step 6 (i.e. step 720 of FIG. 7B) it is determined that the compound event definition is TRUE after 120, FALSE after 130, and TRUE after 140 for the event at index value 110. Then, the TRUE range for the compound event at index value 110 can be set as 110-130 and 140-TAIL, and the FALSE range as 130-131, where TAIL is the current end of the input sequence, say 200. If, on the other hand, the compound event at index value 110 is TRUE after 120, but FALSE after both 130 and 140, the TRUE ranges for the compound event at index value 110 would be 110-130, 139-140, and the FALSE ranges would be 130-139, 140-TAIL. Assume that the compound event whose copy alias event index is at index value 10 evaluated to TRUE before barriers 125, 135, 145 in step 3 (i.e. step 718 of FIG. 7B). Assume also that in step 6 (i.e. step 720 of FIG. 7B), it was determined that the compound event definition is TRUE after 125, FALSE after 135, and TRUE after 145. Then, the TRUE ranges for the compound event at index value 10 can be set as 100-135 and 145-TAIL, and the FALSE range as 135-136.

8. In step 724, the event processing system is now ready to determine whether the particular compound event was logically updated or logically deleted by an event that logically updates or logically deletes any of the compound event's dependent events. Only logical updates to the copy alias event can result in logical updates of the compound event. Logical deletes to the copy alias event and logical updates and deletes to other dependent events can only result in logical deletes of the compound event. Thus, if the compound event computes to FALSE in step 7 (i.e. step 722 of FIG. 7B) after a logical update to the copy alias event, then the compound event is considered to be logically deleted at that point. If the compound event computes to TRUE in step 7 (i.e. step 722 of FIG. 7B) after a logical update to the copy alias event, then the compound event is considered to be logically updated at that point. If the compound event computes to FALSE in step 7 (i.e. step 722 of FIG. 71B) after a logical update or logical delete to a dependent event other than the copy alias event, then the compound event is considered to be logically deleted at that point. If the compound event computes to TRUE in step 7 (i.e. step 722 of FIG. 7B) after a logical update or logical delete to a dependent event other than the copy alias event, then the event processing system does not have to perform any action. It is noted that the last condition is often possible because even if a dependent event is logically deleted, the correlation conditions may match the copy alias event with other dependent events.

6.4 Support for Continuous Querying

In one embodiment, an event processing system may be used for near-real time querying where compound event definitions are evaluated when a sufficient set of new events have been received and appended to the append-only sequence. In this way, the event processing system provides for batch evaluations of compound events in a continuous manner.

In this embodiment, the event processing system maintains a "sequence-marker" that determines the point until which compound events have been evaluated. If the event processing system is able to keep up with the input rate of events, the sequence-marker would be at the head of the new set of input events that will be appended to the append-only sequence and evaluated for base, compound, and logical update definitions. However, because compound event definitions may be complex, the sequence marker may be lagging behind the head of the new set of input events.

In order to address this issue, the techniques described herein provide for determining, at compile time, whether there is a unique "last" event for any particular compound event definition. The last event is the tail of the event chain, when ordered by timestamp attribute, which is not part of an aggregation or EXISTS/NOT EXISTS clause. In many operational scenarios, the ordering induced by timestamp-based join conditions may be analyzed to determine if there is a unique "last event". For example, with respect to the examples described herein in sections 3.1 and 3.2, it can be determined that event e1 is a unique last event. As described herein in section 6.3.1, the base event indices may be loaded sequentially in order to determine the candidate events that will be joined for evaluating a compound event definition. If a certain received event is the unique last event, then only the indices that are beyond the sequence marker need to be loaded. When the base event indices for an event that is the last event are loaded, then only the indices from the sequence marker until the point in the input sequence that will be processed in the current batch, i.e. the tail of the input sequence, need to be loaded. Since the number of event indices belonging to the last events are orders of magnitude less than the number of event indices in the entire input sequence, the last event may be used as the leftmost child of a left-deep join tree. If there are multiple events, say N, that can be a "last" event for a particular compound event definition, N different execution plans may be generated. In each of the execution plans, one of the N events is treated as a unique last event.

In some operational scenarios, there may be many compound event definitions where the largest timestamp event attribute among all timestamp event attributes is a SYSDATE value. (The SYSDATE function returns the current wall-clock time.) For example, a common scenario is to check if an event has happened within a certain time after another earlier event, or if an event is at least N seconds old. In such operational scenarios, it would be desirable to return a result from a continuously evaluated compound event only once. For example, it would be meaningless to continuously return results when a compound event is checking for a non-existence of an event within a certain time.

In order to address this issue, one embodiment provides for detecting, at run-time, whether a timestamp attribute comparison to SYSDATE fails. If the comparison fails, then evaluation of the compound event is scheduled for the next batch evaluation of the compound events defined in the event processing system. This re-scheduling decision would override the last event filter described above (e.g. evaluation of the compound event would be rescheduled even though the event may be the last event and its event index is less than the sequence marker).

6.5 Snapshot Queries

In one embodiment, the techniques described herein provide for evaluating expressions and queries as of any given time in the past. Such expressions and queries may also be referred to as "snapshot" expressions and queries.

For example, in a security alert system base events and compound events can be generated as of any given time in the past. Since according to the techniques described herein the raw event attributes and all event indices are only appended to (but never updated in or deleted from) an append-only sequence, evaluating a snapshot query at a given snapshot time is straightforward—the index into the append-only sequence is determined until which the base event indices need to be loaded in order to compute the results for the desired compound events. Thus, the techniques using append-only sequences described herein may be useful in highly regulated environments such as finance and banking, and for forensic analysis in tightly secured computing environments.

6.6 Failures and Recovery

In one embodiment, an event processing system implementing the techniques described herein may implement the following four types of transactions in order to provide for adequate failure management and recovery:

1. Appending the individual attributes from the input stream of events to the columnar attribute storage structures may be performed as atomic transactions. Recording the current timestamp attribute received from all event source systems may also be performed as an atomic transaction.
2. Evaluating base event definitions and computing the list of event indices in the input stream of events may be performed as atomic transactions. If a failure occurs after event attributes from the stream of events is appended to the attribute storage structures but before the base event indices are appended in the corresponding base event index structures, the base event indices may be re-computed by loading the event attributes from the column stores.
3. The modification list of index values for a logical update event may be computed in an atomic transaction for all events between the current sequence marker and the index of the last event in the currently processed batch of input events. If a failure occurs before the modification list is saved, the list may be re-computed based on the base event indices.
4. Persistently saving the results from evaluating a compound event may be performed as an atomic transaction if the compound event may be used by other compound events. The recovery for the results from evaluating a compound event may be performed in the same manner as the recovery for a modification list of index values.
5. Evaluating the logical updates and deletes for the compound event definitions and persistently saving the modification list for each compound event.

7.0 Hardware Overview

Figure 8:
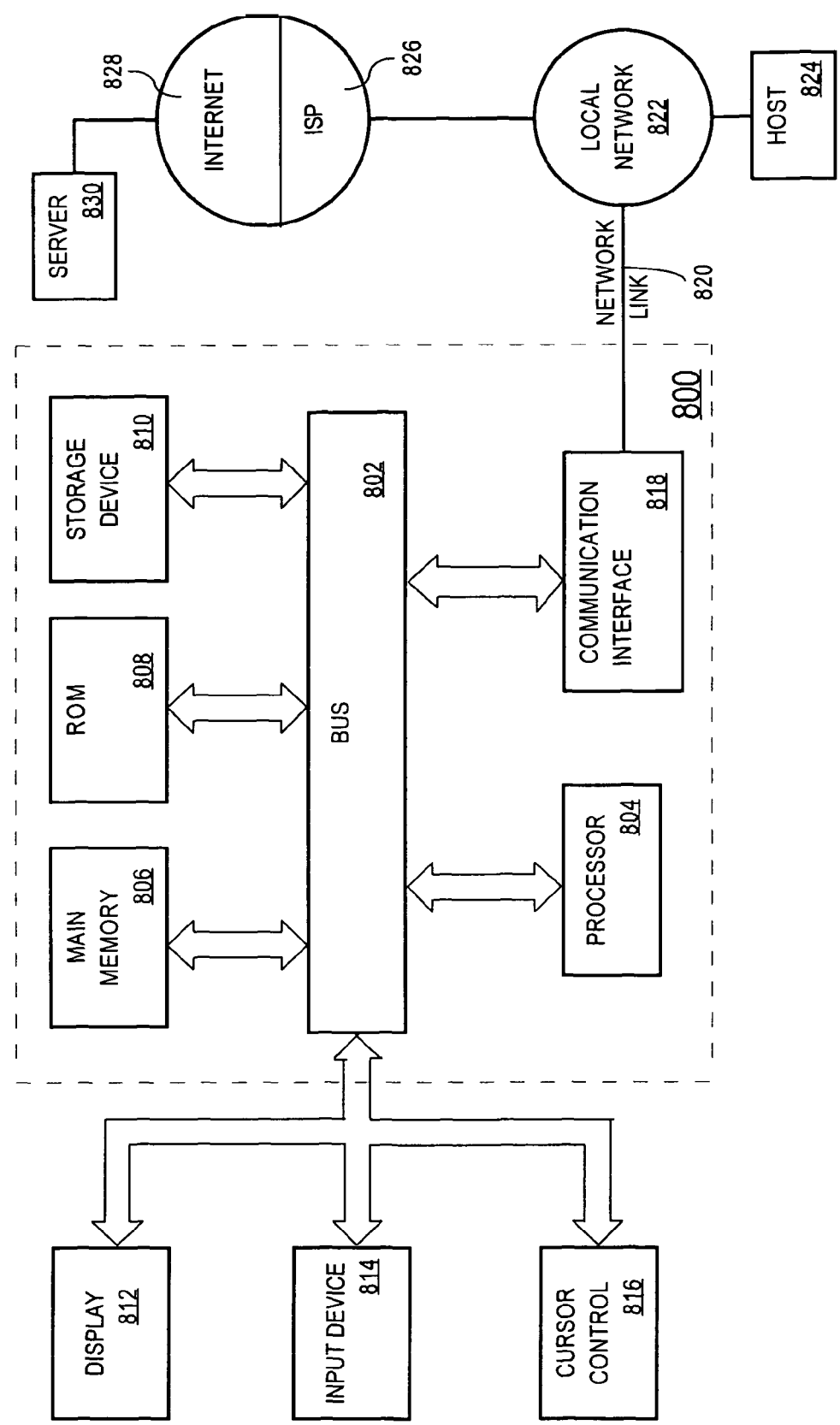
FIG. 8 is a block diagram that illustrates a computer system upon which an embodiment may be implemented.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another machine-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 800, various machine-readable media are involved, for example, in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for evaluating events comprising:
   creating a filter that specifies an array of constant values corresponding to one or more attributes that are associated with one or more events;
   receiving and storing in memory a stream of records, wherein the stream of records is generated to represent a stream of events, and wherein each record of the stream of records includes a set of attributes that are associated with a particular event, of the stream of events, that is represented by said each record;
   selecting a plurality of events from the stream of events by applying the filter to the stream of records in order to select a corresponding plurality of records, wherein applying the filter comprises performing one or more array operations to compare the array of constant values specified in the filter to attributes stored in the plurality of records; and
   storing the plurality of records in an append-only sequence, wherein the append-only sequence is a storage representation of the plurality of events that allows only appending new records that represent new events but does not allow modifying and deleting existing records that represent already existing events;
   wherein the method is performed by one or more computer systems.

2. The method of claim 1, further comprising defining a set of base events according to a particular syntax specification, wherein each base event specifies conditions for selecting one or more events from the stream of events based on one or more attributes included in one or more records, of the stream of records, that represent the one or more events.

3. The method of claim 2, wherein creating the filter further comprises compiling the set of base events to determine the array of constant values.

4. The method of claim 2, wherein applying the filter to the stream of records further comprises:
   determining a candidate set of base events, from the set of base events, that need to be evaluated over the stream of records; and
   determining the plurality of records from the stream of records by performing second one or more array operations to simultaneously evaluate the candidate set of base events over multiple records from the stream of records.

5. The method of claim 2, further comprising:
   defining a logical update event based on at least two base events of the set of base events, wherein the logical update event indicates a first event of the plurality of events that changes the effect of a second event of the plurality of events, wherein the second event has occurred earlier than the first event;
   recording a modification list for the logical update event, wherein the modification list identifies a pair of the first event and the second event; and
   based at least in part on the modification list, evaluating the logical update event over multiple records of the plurality of records.

6. The method of claim 5, wherein: the method further comprises:
   determining, from the plurality of records, a first set of candidate records that represent the first event, wherein the first set of records includes a first record for which the logical update event is to be evaluated;
   determining, from the plurality of records, a second set of candidate records that represent the second event; and
   joining the first set of records to the second set of records to obtain a result set of records, wherein the latest occurring record in the result set is a second record that represents the second event; and
   recording the modification list further comprises recording a pair of indices that identify the first record and the second record in the append-only sequence.

7. The method of claim 2, further comprising:
   defining a set of compound events according to the particular syntax specification, wherein each compound event specifies correlation conditions between multiple base events of the set of base events; and
   evaluating the set of compound events over the plurality of records.

8. The method of claim 7, wherein evaluating the set of compound events further comprises continuously evaluating the set of compound events over batches of records, of the plurality of records, as the batches of records are stored in the append-only sequence.

9. The method of claim 8, wherein continuously evaluating the set of compound events over the batches of records further comprises:
   maintaining a sequence-marker that determines the point in the append-only sequence until which the set of compound events has been evaluated;

loading in memory as a batch of records only records that are stored in the append-only sequence after the sequence-marker; and evaluating the set of compound events for the loaded batch of records.

10. The method of claim 7, wherein:

the method further comprises analyzing the correlation conditions specified in one or more compound events of the set of compound events to determine whether there exist any timestamp-based orderings among the multiple base events specified in the one or more compound events; and evaluating the set of compound events further comprises evaluating the one or more compound events by computing the correlation conditions based on one or more timestamp-based orderings when the one or more timestamp-based orderings are determined to exist among the multiple base events.

11. The method of claim 2, further comprising:

defining a compound event according to the particular syntax specification, wherein the compound event specifies correlation conditions between multiple base events of the set of base events;

based on a particular event of the plurality of events and on the correlation conditions specified in the compound event, analyzing the compound event to determine an additional event, not among the plurality of events, that can be scheduled for future evaluation; and scheduling an evaluation of the additional event at a future point in time, wherein the evaluation of the additional event comprises evaluating the compound event.

12. The method of claim 2, further comprising:

defining a compound event according to the particular syntax specification, wherein the compound event specifies correlation conditions between multiple base events of the set of base events;

defining a logical update event based on at least one base event of the multiple base events, wherein the logical update event when evaluated affects at least one evaluation of the compound event, wherein the logical update event indicates a first event of the plurality of events that changes the effect of a second event of the plurality of events; and evaluating the compound event, wherein evaluating the compound event comprises:

determining first ranges of records, stored in the append-only sequence, for which the compound event evaluates to TRUE; and determining second ranges of records, stored in the append-only sequence, for which the compound event evaluates to FALSE.

13. The method of claim 12, wherein:

the method further comprises:

maintaining the logical update event and the compound event in such order that the logical update event is always evaluated before the compound event is evaluated; and marking, as a copy alias event, a single base event from the at least one base event defined in the logical update event; and evaluating the compound event further comprises:

evaluating the compound event at one or more barrier points in the append-only sequence, wherein the one or more barrier points are those points in the append-only sequence at which a dependent event of the compound event has been recorded;

based on the one or more barrier points, determining first points in the append-only sequence at which the compound event is evaluated to TRUE;

determining a list of undo points in the append-only sequence, wherein the undo points are second points in the append-only sequence at which the compound event evaluates to FALSE, and wherein determining the list of undo points comprises evaluating the copy alias event after at least one of the one or more barrier points; and determining the first ranges of records and the second ranges of records based on the first points and the second points determined in the append-only sequence.

14. A method for evaluating events comprising:

receiving a request to evaluate a compound event, wherein the compound event specifies correlation conditions between a set of base events, wherein the correlation conditions specify one or more join operations between the set of base events, wherein each base event in the set of base events specifies conditions for selecting one or more events that are included in a plurality of events that are stored in an append-only sequence;

retrieving a sequence of events from the append-only sequence, wherein each event in the sequence of events has been selected into the plurality of events and stored in the append-only sequence based on the conditions specified in one or more base events of the set of base events; and evaluating the compound event, wherein evaluating the compound event comprises:

analyzing the correlation conditions that are specified in the compound event;

automatically splitting the sequence of events into two or more sub-sequences of events based on the analysis of the correlation conditions; and processing the two or more sub-sequences of events in parallel;

wherein the method is performed by one or more computer systems.

15. The method of claim 14, wherein the append-only sequence is a storage representation of the plurality of events that allows only appending new records that represent new events but does not allow modifying and deleting existing records that represent already existing events.

16. The method of claim 14, wherein:

each event in the sequence of events is associated with a set of attributes;

the correlation conditions specified in the compound event indicate a group of attributes from the sets of attributes associated with the sequence of events;

analyzing the correlation conditions further comprises determining a maximal partitioning key for the compound event, wherein the maximal partitioning key includes one or more attributes from the group of attributes indicated in the correlation conditions; and automatically splitting the sequence of events further comprises determining the two or more sub-sequences of events based on unique values of the one or more attributes included in the maximal partitioning key.

17. A machine-readable volatile or non-volatile medium storing one or more sequences of instructions comprising instructions which, when executed by one or more processors, cause the one or more processors to perform:

creating a filter that specifies an array of constant values corresponding to one or more attributes that are associated with one or more events;

receiving and storing in memory a stream of records, wherein the stream of records is generated to represent a stream of events, and wherein each record of the stream of records includes a set of attributes that are associated with a particular event, of the stream of events, that is represented by said each record;

selecting a plurality of events from the stream of events by applying the filter to the stream of records in order to select a corresponding plurality of records, wherein applying the filter comprises performing one or more array operations to compare the array of constant values specified in the filter to attributes stored in the plurality of records; and storing the plurality of records in an append-only sequence, wherein the append-only sequence is a storage representation of the plurality of events that allows only appending new records that represent new events but does not allow modifying and deleting existing records that represent already existing events.

18. The machine-readable volatile or non-volatile medium of claim 17, wherein the one or more sequences of instructions further comprise instructions which, when executed by the one or more processors, cause the one or more processors to perform defining a set of base events according to a particular syntax specification, wherein each base event specifies conditions for selecting one or more events from the stream of events based on one or more attributes included in one or more records, of the stream of records, that represent the one or more events.

19. The machine-readable volatile or non-volatile medium of claim 18, wherein the instructions that cause creating the filter further comprise instructions which, when executed by the one or more processors, cause the one or more processors to perform compiling the set of base events to determine the array of constant values.

20. The machine-readable volatile or non-volatile medium of claim 18, wherein the instructions that cause applying the filter to the stream of records further comprise instructions which, when executed by the one or more processors, cause the one or more processors to perform:

determining a candidate set of base events, from the set of base events, that need to be evaluated over the stream of records; and determining the plurality of records from the stream of records by performing second one or more array operations to simultaneously evaluate the candidate set of base events over multiple records from the stream of records.

21. The machine-readable volatile or non-volatile medium of claim 18, wherein the one or more sequences of instructions further comprise instructions which, when executed by the one or more processors, cause the one or more processors to perform:

defining a logical update event based on at least two base events of the set of base events, wherein the logical update event indicates a first event of the plurality of events that changes the effect of a second event of the plurality of events, wherein the second event has occurred earlier than the first event;

recording a modification list for the logical update event, wherein the modification list identifies a pair of the first event and the second event; and based at least in part on the modification list, evaluating the logical update event over multiple records of the plurality of records.

22. The machine-readable volatile or non-volatile medium of claim 21, wherein: the one or more sequences of instructions further comprise instructions which, when executed by the one or more processors, cause the one or more processors to perform:

determining, from the plurality of records, a first set of candidate records that represent the first event, wherein the first set of records includes a first record for which the logical update event is to be evaluated;

determining, from the plurality of records, a second set of candidate records that represent the second event; and joining the first set of records to the second set of records to obtain a result set of records, wherein the latest occurring record in the result set is a second record that represents the second event; and the instructions that cause recording the modification list further comprise instructions which, when executed by the one or more processors, cause the one or more processors to perform recording a pair of indices that identify the first record and the second record in the append-only sequence.

23. The machine-readable volatile or non-volatile medium of claim 18, wherein the one or more sequences of instructions further comprise instructions which, when executed by the one or more processors, cause the one or more processors to perform:

defining a set of compound events according to the particular syntax specification, wherein each compound event specifies correlation conditions between multiple base events of the set of base events; and evaluating the set of compound events over the plurality of records.

24. The machine-readable volatile or non-volatile medium of claim 23, wherein the instructions that cause evaluating the set of compound events further comprise instructions which, when executed by the one or more processors, cause the one or more processors to perform continuously evaluating the set of compound events over batches of records, of the plurality of records, as the batches of records are stored in the append-only sequence.

25. The machine-readable volatile or non-volatile medium of claim 24, wherein the instructions that cause continuously evaluating the set of compound events over the batches of records further comprise instructions which, when executed by the one or more processors, cause the one or more processors to perform:

maintaining a sequence-marker that determines the point in the append-only sequence until which the set of compound events has been evaluated;

loading in memory as a batch of records only records that are stored in the append-only sequence after the sequence-marker; and evaluating the set of compound events for the loaded batch of records.

26. The machine-readable volatile or non-volatile medium of claim 23, wherein:

the one or more sequences of instructions further comprise instructions which, when executed by the one or more processors, cause the one or more processors to perform analyzing the correlation conditions specified in one or more compound events of the set of compound events to determine whether there exist any timestamp-based orderings among the multiple base events specified in the one or more compound events; and the instructions that cause evaluating the set of compound events further comprise instructions which, when executed by the one or more processors, cause the one or more processors to perform evaluating the one or more compound events by computing the correlation conditions based on one or more timestamp-based orderings when the one or more timestamp-based orderings are determined to exist among the multiple base events.

27. The machine-readable volatile or non-volatile medium of claim 18, wherein the one or more sequences of instructions further comprise instructions which, when executed by the one or more processors, cause the one or more processors to perform:

defining a compound event according to the particular syntax specification, wherein the compound event specifies correlation conditions between multiple base events of the set of base events;

based on a particular event of the plurality of events and on the correlation conditions specified in the compound event, analyzing the compound event to determine an additional event, not among the plurality of events, that can be scheduled for future evaluation; and scheduling an evaluation of the additional event at a future point in time, wherein the evaluation of the additional event comprises evaluating the compound event.

28. The machine-readable volatile or non-volatile medium of claim 18, wherein the one or more sequences of instructions further comprise instructions which, when executed by the one or more processors, cause the one or more processors to perform:

defining a compound event according to the particular syntax specification, wherein the compound event specifies correlation conditions between multiple base events of the set of base events;

defining a logical update event based on at least one base event of the multiple base events, wherein the logical update event when evaluated affects at least one evaluation of the compound event, wherein the logical update event indicates a first event of the plurality of events that changes the effect of a second event of the plurality of events; and evaluating the compound event, wherein evaluating the compound event comprises:

determining first ranges of records, stored in the append-only sequence, for which the compound event evaluates to TRUE; and determining second ranges of records, stored in the append-only sequence, for which the compound event evaluates to FALSE.

29. The machine-readable volatile or non-volatile medium of claim 18, wherein:

the one or more sequences of instructions further comprise instructions which, when executed by the one or more processors, cause the one or more processors to perform:

maintaining the logical update event and the compound event in such order that the logical update event is always evaluated before the compound event is evaluated; and marking, as a copy alias event, a single base event from the at least one base event defined in the logical update event; and the instructions that cause evaluating the compound event further comprise instructions which, when executed by the one or more processors, cause the one or more processors to perform:

evaluating the compound event at one or more barrier points in the append-only sequence, wherein the one or more barrier points are those points in the append-only sequence at which a dependent event of the compound event has been recorded;

based on the one or more barrier points, determining first points in the append-only sequence at which the compound event is evaluated to TRUE;

determining a list of undo points in the append-only sequence, wherein the undo points are second points in the append-only sequence at which the compound event evaluates to FALSE, and wherein determining the list of undo points comprises evaluating the copy alias event after at least one of the one or more barrier points; and determining the first ranges of records and the second ranges of records based on the first points and the second points determined in the append-only sequence.

30. A machine-readable volatile or non-volatile medium storing one or more sequences of instructions comprising instructions which, when executed by one or more processors, cause the one or more processors to perform:

receiving a request to evaluate a compound event, wherein the compound event specifies correlation conditions between a set of base events, wherein the correlation conditions specify one or more join operations between the set of base events, wherein each base event in the set of base events specifies conditions for selecting one or more events that are included in a plurality of events that are stored in an append-only sequence;

retrieving a sequence of events from the append-only sequence, wherein each event in the sequence of events has been selected into the plurality of events and stored in the append-only sequence based on the conditions specified in one or more base events of the set of base events; and evaluating the compound event, wherein evaluating the compound event comprises:

analyzing the correlation conditions that are specified in the compound event;

automatically splitting the sequence of events into two or more sub-sequences of events based on the analysis of the correlation conditions; and processing the two or more sub-sequences of events in parallel.

31. The machine-readable volatile or non-volatile medium of claim 30, wherein the append-only sequence is a storage representation of the plurality of events that allows only appending new records that represent new events but does not allow modifying and deleting existing records that represent already existing events.

32. The machine-readable volatile or non-volatile medium of claim 30, wherein:

each event in the sequence of events is associated with a set of attributes;

the correlation conditions specified in the compound event indicate a group of attributes from the sets of attributes associated with the sequence of events;

the instructions that cause analyzing the correlation conditions further comprise instructions which, when executed by the one or more processors, cause the one or more processors to perform determining a maximal partitioning key for the compound event, wherein the maximal partitioning key includes one or more attributes from the group of attributes indicated in the correlation conditions; and the instructions that cause automatically splitting the sequence of events further comprise instructions which, when executed by the one or more processors, cause the one or more processors to perform determining the two or more sub-sequences of events based on unique values of the one or more attributes included in the maximal partitioning key.

* * * * *

UNITED STATES PATENT AND TRADEMARK OFFICE
CERTIFICATE OF CORRECTION

PATENT NO. : 7,840,575 B2  
APPLICATION NO. : 11/638743  
DATED : November 23, 2010  
INVENTOR(S) : Sashikanth Chandrasekaran Page 1 of 1

It is certified that error appears in the above-identified patent and that said Letters Patent is hereby corrected as shown below:

In column 23, line 32, delete "71B)" and insert -- 7B) --, therefor.

Signed and Sealed this
Second Day of August, 2011

David J. Kappos
*Director of the United States Patent and Trademark Office*